United States Patent
Yamanaka et al.

(10) Patent No.: US 10,486,490 B2
(45) Date of Patent: Nov. 26, 2019

(54) AIR-CONDITIONING CONTROL DEVICE

(71) Applicant: Panasonic Intellectual Property Management Co., Ltd., Osaka (JP)

(72) Inventors: Hiroshi Yamanaka, Fukui (JP); Takanori Sugiyama, Fukui (JP); Isao Hattori, Fukui (JP); Katsumi Kakimoto, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 155 days.

(21) Appl. No.: 15/558,213

(22) PCT Filed: Mar. 25, 2016

(86) PCT No.: PCT/JP2016/001733
§ 371 (c)(1),
(2) Date: Sep. 14, 2017

(87) PCT Pub. No.: WO2016/166938
PCT Pub. Date: Oct. 20, 2016

(65) Prior Publication Data
US 2018/0072133 A1    Mar. 15, 2018

(30) Foreign Application Priority Data

Apr. 16, 2015 (JP) .................. 2015-084051
Apr. 17, 2015 (JP) .................. 2015-084626
Apr. 17, 2015 (JP) .................. 2015-084627

(51) Int. Cl.
*B60H 1/00* (2006.01)
*F24F 11/89* (2018.01)

(52) U.S. Cl.
CPC ....... *B60H 1/00742* (2013.01); *B60H 1/0075* (2013.01); *B60H 1/00807* (2013.01);
(Continued)

(58) Field of Classification Search
CPC ............. B60H 1/00742; B60H 1/0075; B60H 1/00807; B60H 1/00828; B60H 1/00871; F24F 11/89
See application file for complete search history.

(56) References Cited

U.S. PATENT DOCUMENTS 6,397,615 B1    6/2002 Kawai et al.
10,386,795 B2*  8/2019 Vega .................. F24F 11/30
(Continued)

FOREIGN PATENT DOCUMENTS

EP    1270287 A2    1/2003
FR    2917855 A1    12/2008
(Continued)

OTHER PUBLICATIONS

The Extended European Search Report dated Mar. 15, 2018 for the related European Patent Application No. 16779737.2.
(Continued)

*Primary Examiner* — Robert T Nguyen
(74) *Attorney, Agent, or Firm* — McDermott Will & Emery LLP

(57) ABSTRACT

An air-conditioning control device according to the present disclosure includes: a first temperature sensor which detects the temperature of an occupant; a processing unit which estimates, from the result of detection by the first temperature sensor, the thermal sensation felt by the occupant; and a control unit which controls an air conditioner according to the thermal sensation estimated by the processing unit. The processing unit determines a change in a clothing amount of the occupant from the result of detection by the first temperature sensor, and the control unit controls the output of the air conditioner according to the change in the clothing amount determined by the processing unit.

19 Claims, 19 Drawing Sheets

(52) U.S. Cl.
   CPC ..... B60H 1/00828 (2013.01); B60H 1/00871 (2013.01); F24F 11/89 (2018.01)

(56) References Cited

U.S. PATENT DOCUMENTS

| | | | |
|---|---|---|---|
| 2001/0039806 A1 | 11/2001 | Kawai et al. | |
| 2005/0267646 A1* | 12/2005 | Ichishi | B60H 1/00742 700/300 |
| 2009/0031741 A1 | 2/2009 | Hara et al. | |
| 2013/0073093 A1* | 3/2013 | Songkakul | G05B 15/02 700/276 |
| 2013/0334635 A1* | 12/2013 | Kennedy | G01J 5/045 257/431 |
| 2014/0217785 A1* | 8/2014 | Arens | A47C 7/748 297/180.12 |
| 2015/0168002 A1* | 6/2015 | Plitkins | F24F 11/30 165/237 |
| 2016/0003493 A1* | 1/2016 | Katz | F24F 11/30 700/275 |
| 2016/0116178 A1* | 4/2016 | Vega | F24F 11/52 700/276 |
| 2016/0123617 A1* | 5/2016 | Vega | G05B 13/0265 |
| 2018/0072133 A1* | 3/2018 | Yamanaka | B60H 1/00742 |
| 2019/0107309 A1* | 4/2019 | Assouad | G05D 22/02 |

FOREIGN PATENT DOCUMENTS

| | | |
|---|---|---|
| JP | 4-103427 | 4/1992 |
| JP | 10-230729 | 9/1998 |
| JP | 2001-347816 | 12/2001 |
| JP | 2001-349786 A | 12/2001 |
| JP | 2004-268797 | 9/2004 |
| JP | 2005-104221 | 4/2005 |
| JP | 3816317 B | 8/2006 |
| JP | 2009-046115 | 3/2009 |
| JP | 4252368 B | 4/2009 |
| JP | 4327498 B | 9/2009 |

OTHER PUBLICATIONS

International Search Report of PCT application No. PCT/JP2016/001733 dated Jun. 21, 2016.

* cited by examiner

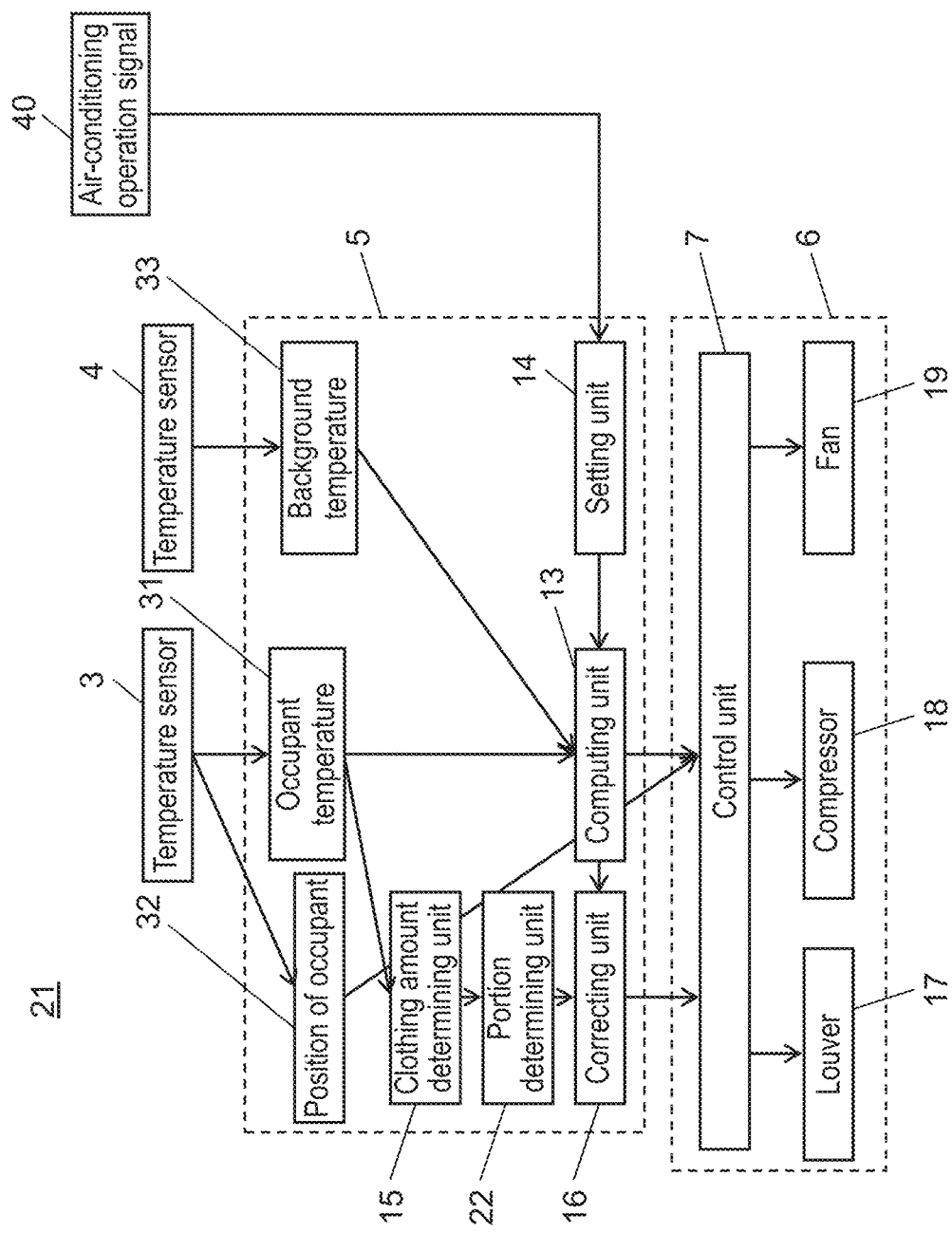

AIR-CONDITIONING CONTROL DEVICE

This application is a U.S. national stage application of the PCT International Application No. PCT/JP2016/001733 filed on Mar. 25, 2016, which claims the benefit of foreign priority of Japanese patent application No. 2015-084051 filed on Apr. 16, 2015, Japanese patent application No. 2015-084626 filed on Apr. 17, 2015, and Japanese patent application No. 2015-084627 filed on Apr. 17, 2015, the contents all of which are incorporated herein by reference.

TECHNICAL FIELD

The present disclosure relates to an air-conditioning control device which controls air conditioning by determining the thermal sensation felt by an occupant.

BACKGROUND ART

Conventionally, an air conditioner for a vehicle measures an interior vehicle temperature, an occupant's temperature, etc., and controls air-conditioning of the vehicle.

The conventional air conditioner for a vehicle includes: an air-conditioning unit that supplies air into a vehicle; an information obtainment unit that obtains state information indicating a state related to the vehicle; an estimation unit that estimates an air-conditioning state; a determination unit that determines a recommended operation; and a control unit that controls air conditioning. In the case where a setting operation for improving fuel economy is performed on the basis of the state information obtained by the information obtainment unit, the estimation unit estimates in what air-conditioning state the interior of the vehicle would be after predetermined time elapses. When the air-conditioning state estimated by the estimation unit satisfies a comfort condition as a result of the estimation that the interior of the vehicle would be comfortable for occupants, the determination unit recommends the setting operation. The control unit controls the air-conditioning unit according to the setting operation recommended by the determination unit (refer to Patent Literature (PTL) 1).

CITATION LIST

Patent Literature

PTL 1: Unexamined Japanese Patent Publication No. 2009-046115
PTL 2: Japanese Patent No. 3,816,317
PTL 3: Unexamined Japanese Patent Publication No. 2004-268797
PTL 4: Japanese Patent No. 4,327,498
PTL 5: Japanese Patent No. 4,252,368

SUMMARY OF THE INVENTION

An air-conditioning control device according to the present disclosure includes: a first temperature sensor which detects the temperature of an occupant; a processing unit which estimates, from the result of detection by the first temperature sensor, the thermal sensation felt by the occupant; and a control unit which controls an air conditioner according to the thermal sensation estimated by the processing unit. The processing unit determines a change in a clothing amount of the occupant from the result of detection by the first temperature sensor, and the control unit controls the output of the air conditioner according to the change in the clothing amount determined by the processing unit.

BRIEF DESCRIPTION OF THE DRAWINGS

FIG. 5 is a block diagram illustrating a configuration of an air-conditioning control device according to exemplary embodiment 2.

DESCRIPTION OF EMBODIMENTS

Before description of an air-conditioning control device according to the present exemplary embodiment, a problem with the technique disclosed in PTL 1 will be described.

The conventional air conditioner is not properly controlled, for example, when an occupant takes off clothing, but does not voluntarily operate the air conditioner. This means that the conventional air conditioner is unable to sufficiently provide a space comfortable for the occupant.

Hereinafter, an air-conditioning control device according to the present exemplary embodiment will be described with reference to the drawings. Note that the same or like elements will be assigned the same reference marks throughout the drawings, and description thereof will be omitted. Furthermore, the structural elements in the exemplary embodiments may be arbitrarily combined within a range that does not create any contradiction.

Exemplary Embodiment 1

Figure 1:
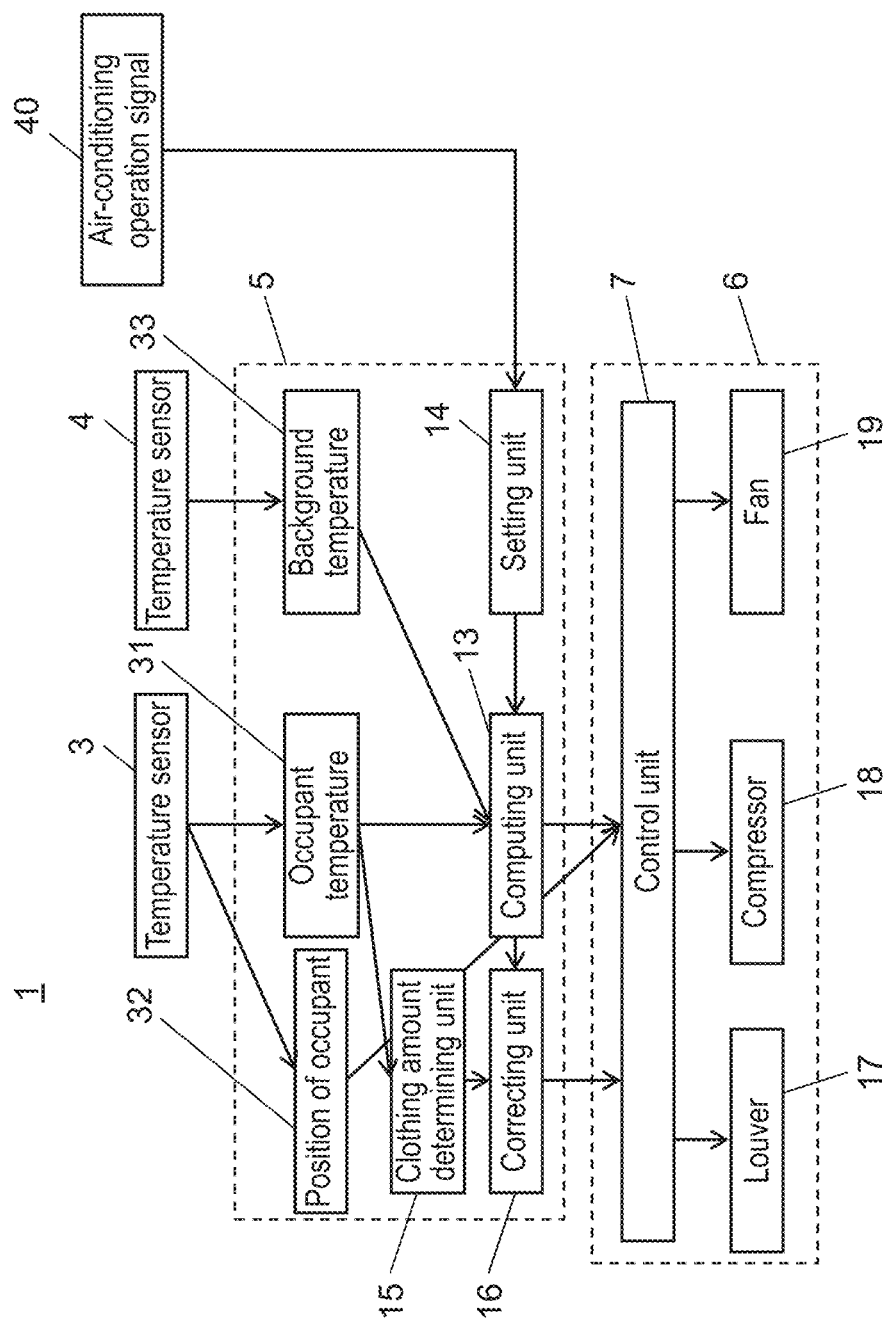
FIG. 1 is a block diagram illustrating an air-conditioning control device according to exemplary embodiment 1.
Figure 2:
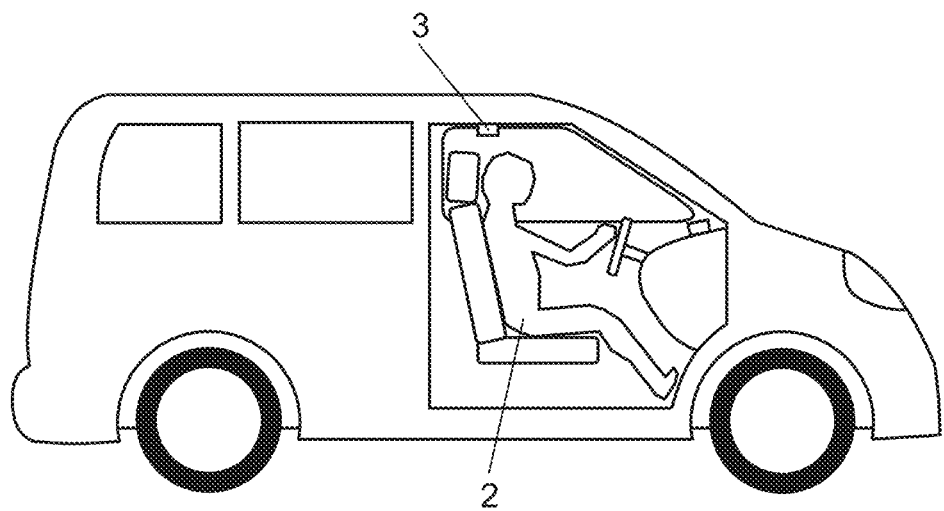
FIG. 2 illustrates a vehicle in which an air-conditioning control device according to exemplary embodiment 1 is provided.
Figure 3:
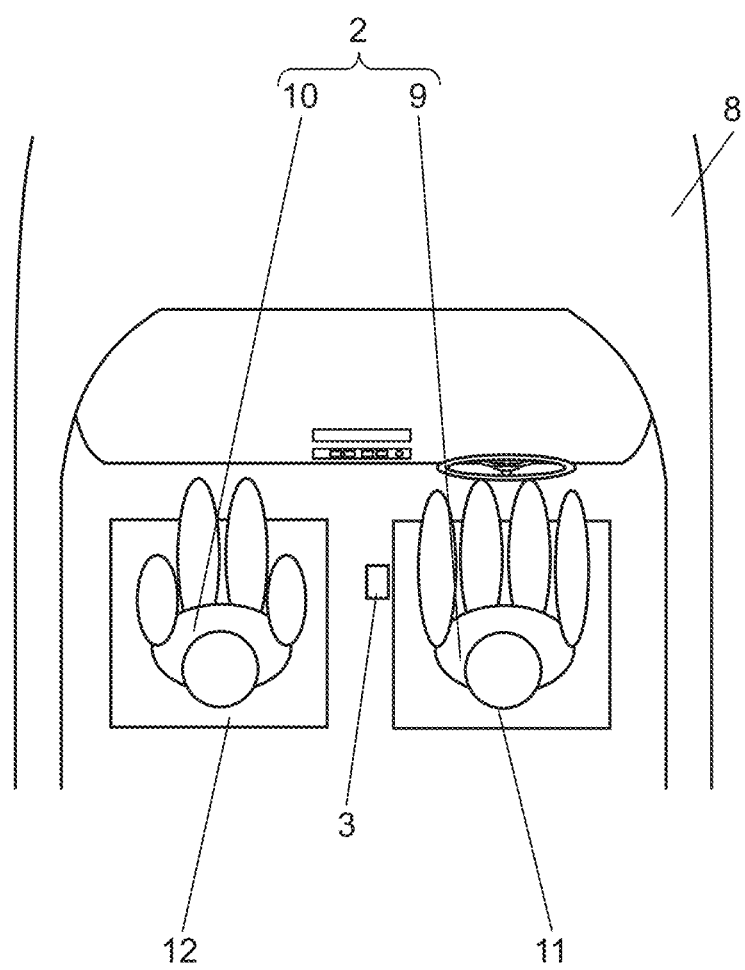
FIG. 3 is a top view of a part of the vehicle illustrated in FIG. 2.

FIG. 1 is a block diagram illustrating a configuration of air-conditioning control device 1 according to exemplary embodiment 1, FIG. 2 illustrates vehicle 8 in which air-conditioning control device 1 is provided, and FIG. 3 is a top view of a part of vehicle 8.

Air-conditioning control device 1 illustrated in FIG. 1 is installed inside vehicle 8 (illustrated in FIG. 2). Air-conditioning control device 1 includes temperature sensor 3, temperature sensor 4, processing unit 5, and control unit 7. Temperature sensor 3 detects the temperature of occupant 2 present inside vehicle 8 (hereinafter referred to as "occupant temperature 31"). Temperature sensor 4 detects the temperature of surroundings of occupant 2 (for example, the temperature of a seat). Hereinafter, the temperature of surroundings of occupant 2 is referred to as "background temperature 33". Processing unit 5 estimates, from the result of detection by temperature sensor 3 (occupant temperature 31), the thermal sensation felt by occupant 2 (whether occupant 2 feels hot or cold). Air conditioner 6 is controlled by control unit 7 according to the thermal sensation estimated by processing unit 5.

Temperature sensor 3 according to exemplary embodiment 1 is configured using an infrared sensor.

Note that the infrared sensor is one example of temperature sensor 3; detection means other than the infrared sensor may be used as temperature sensor 3.

The infrared sensor includes a thermal infrared detection unit in which temperature sensing units are embedded, and each of the temperature sensing units includes a thermoelectric conversion unit configured using a thermopile that converts, into electrical energy, thermal energy of infrared rays radiated from a detection subject (for example, a person). In the infrared sensor, a×b pixel units (non-contact infrared sensing elements) including the temperature sensing units and metal-oxide-semiconductor (MOS) transistors for drawing the output voltages of the temperature sensing units are arranged on the side of one surface of a semiconductor substrate in a two-dimensional array with "a" rows and "b" columns. The pixel units in exemplary embodiment 1 are in eight rows and eight columns.

In sum, in the present exemplary embodiment, temperature sensor 3 is configured using an infrared sensor, and the infrared sensor includes infrared sensing elements in a two-dimensional array configured using a plurality of pixel units.

Temperature sensor 3 which is configured using an infrared sensor is installed on the ceiling so as to be able to detect driver 9 and occupant 10 in passenger seat 12 who are detection subjects. Temperature sensor 3 is preferably positioned between driver seat 11 and passenger seat 12 in a top view, as illustrated in FIG. 3. Temperature sensor 3 is connected to a scanning unit configured using a motor or the like. The scanning unit will be described later in exemplary embodiment 3 with reference to FIG. 8A. Subsequently, temperature sensor 3 is scanned so that the entire body of occupant 2 is included in the detection region of temperature sensor 3. Processing unit 5 creates a temperature distribution by adding up the temperature distributions obtained through scanning of temperature sensor 3 (infrared sensor). In this way, a high-resolution thermal image is obtained.

With the above-described configuration, the temperature of occupant 2 is accurately detected. The temperature distribution obtained on the basis of the output from temperature sensor 3 is used to determine the presence or the absence of occupant 2 and detect occupant position 32.

Note that the infrared sensor (temperature sensor 3) does not always need to be disposed on the ceiling as long as it is disposed in a position in which it can detect occupant 2. For example, the infrared sensor may be installed on a pillar (a column portion) of vehicle 8.

A thermistor, for example, is used for temperature sensor 4. Temperature sensor 4 (not illustrated in FIG. 2) is installed inside vehicle 8 so as to be able to detect a background temperature. Note that temperature sensor 4 does not always need to be configured using a thermistor as long as it can detect a background temperature.

A microcomputer is used for processing unit 5 in the present exemplary embodiment. Processing unit 5 includes computing unit 13, setting unit 14, clothing amount determining unit 15, and correcting unit 16. On the basis of the temperature distribution obtained by the infrared sensor (temperature sensor 3), computing unit 13 estimates the thermal sensation felt by occupant 2. A threshold value to be used in the estimation of the thermal sensation is set in setting unit 14. On the basis of the temperature distribution obtained by the infrared sensor (temperature sensor 3), clothing amount determining unit 15 determines a change in the clothing amount of occupant 2. According to the result of clothing amount determination by clothing amount determining unit 15, correcting unit 16 corrects the thermal sensation estimated by computing unit 13.

Air conditioner 6 includes control unit 7, and louver 17, compressor 18, and fan 19 which are connected to control unit 7. According to the output of computing unit 13, control unit 7 controls air conditioner 6 by controlling louver 17, compressor 18, and fan 19.

Next, the estimation of the thermal sensation by processing unit 5 and the control of air conditioner 6 will be described.

First, the infrared sensor (temperature sensor 3) detects a temperature distribution of occupant 2. When there are two or more occupants 2, the average temperature of occupants 2 (hereinafter described as occupant temperature 31) is calculated from the obtained temperature distribution. Temperature sensor 4 detects background temperature 33. On the basis of the result of detection by the infrared sensor (temperature sensor 3) (occupant temperature 31) and the result of detection by temperature sensor 4 (background temperature 33), computing unit 13 estimates the thermal sensation felt by occupant 2. The thermal sensation has preset stages such as "hot", "very hot", "cold", "very cold", and "pleasant" according to how occupant 2 feels.

Air conditioner 6 is controlled on the basis of the result of estimation of the thermal sensation. For example, when the result of estimation of the thermal sensation is "hot", control such as decreasing the temperature setting on air conditioner 6 or raising the cooling fan speed is performed. When the result of estimation of the thermal sensation is "cold", control such as increasing the temperature setting on air conditioner 6 or raising the heating fan speed is performed.

In air-conditioning control device 1 according to the present embodiment, air conditioner 6 is controlled according to the result of estimation of the thermal sensation, eliminating the need for occupant 2 to voluntarily control air conditioner 6. In other words, even if occupant 2 does not control air conditioner 6, air conditioner 6 is controlled so that occupant 2 can stay comfortable inside vehicle 8. Thus, the degree of comfort for occupant 2 improves.

There are, however, the case where occupant 2 puts on or takes off clothing when processing unit 5 estimates the thermal sensation or when control unit 7 controls air conditioner 6 according to the result of estimation of the thermal sensation. Clothing amount determining unit 15 of processing unit 5 determines putting on or taking off of clothing from the result of detection by temperature sensor 3 (occupant temperature 31). Subsequently, correcting unit 16 corrects the result of estimation of the thermal sensation according to a change in the clothing amount.

Figure 4A:
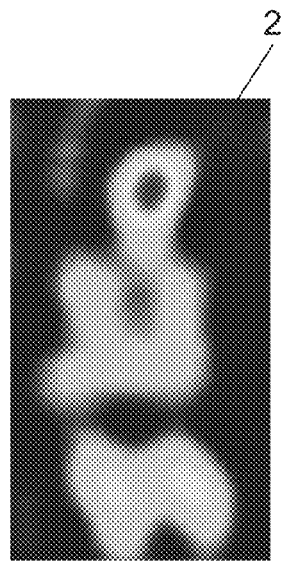
FIG. 4A illustrates a temperature distribution of an occupant before taking off clothing.
Figure 4B:
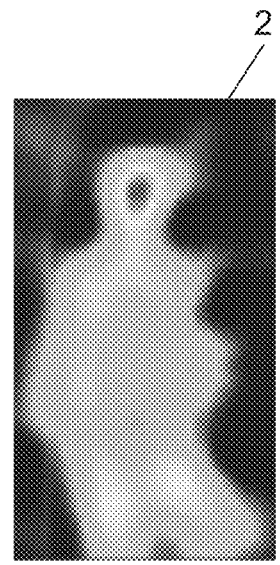
FIG. 4B illustrates a temperature distribution of an occupant after taking off clothing.

Next, the temperature distributions of occupant 2 before and after putting on or taking off of clothing FIG. 4A illustrates the temperature distribution of occupant 2 (occupant temperature 31) before taking off clothing, and FIG. 4B illustrates the temperature distribution of occupant 2 (occupant temperature 31) after taking off clothing. In FIG. 4A and FIG. 4B, color density indicates a temperature. Higher dense indicates a higher temperature.

When occupant 2 puts on or takes off clothing, occupant temperature 31 changes. Specifically, occupant temperature 31 slowly changes when occupant temperature 31 changes by the influence of air conditioner 6 or the like, and occupant temperature 31 rapidly changes when occupant 2 puts on or takes off clothing A clothing amount threshold value for determining a change in the clothing amount is set in clothing amount determining unit 15, and when occupant temperature 31 changes by a clothing amount threshold value or more within a predetermined period of time, clothing amount determining unit 15 determines that occupant 2 has put on or taken off clothing.

For example, assume that the clothing amount threshold value is set to twice and the determination time is set to 30 seconds. When occupant temperature 31 is changed twice or more within 30 seconds, clothing amount determining unit 15 determines that clothing has been put on or taken off. It is possible to accurately determine putting on or taking off of clothing without being influenced by changes in temperature caused by air conditioner 6, changes in temperature due to solar radiation, or the like. Note that the clothing amount threshold value is not limited to twice and the determination time is not limited to 30 seconds. Determining putting on or taking off of clothing when occupant temperature 31 changes twice or more within 30 seconds is preferred. Configuring the settings to such allows putting on or taking off of clothing to be accurately determined in appropriate time.

When putting on or taking off of clothing is determined, at least one of the parameters (fan speed, air temperature, and air flow direction) of air conditioner 6 is controlled according to the result of determination. For example, when occupant temperature 31 rapidly increases by two or more degrees, clothing amount determining unit 15 determines that occupant 2 has taken off clothing. Air conditioner 6 is then controlled to decrease the preset temperature by one degree. When occupant temperature 31 rapidly decreases by two or more degrees, air conditioner 6 is controlled to increase the preset temperature by one degree assuming that occupant 2 has put on clothing. In this way, putting on or taking off of clothing of occupant 2 is determined, and a parameter of air conditioner 6 is controlled according to the result of determination about putting on or taking off of the clothing, allowing the degree of comfort for occupant 2 to further improve.

A standby time is set in processing unit 5. Air conditioner 6 is not controlled until the standby time has elapsed after air conditioner 6 was controlled according to the estimated thermal sensation. The thermal sensation is estimated again after the standby time has elapsed, and air conditioner 6 is controlled according to this result of estimation of the thermal sensation. In this way, air conditioner 6 is not controlled until the standby time has elapsed after air conditioner 6 was controlled according to the estimated thermal sensation, and thus air conditioner 6 is not frequently controlled. Specifically, it is possible to keep occupant 2 from feeling discomfort due to frequent control of air conditioner 6. Note that time during which air conditioner 6 is not controlled can be set as appropriate. This time may be set as appropriate according to vehicle 8, the conditions of use, etc. For example, this time may be set to five minutes or 10 minutes.

In the case where there are two or more occupants 2, occupants 2 may be distinguished from each other on the temperature distribution obtained by temperature sensor 3, the thermal sensation felt by each of occupants 2 may be estimated, and thus air conditioner 6 may be controlled differently for each of occupants 2. In this way, different control for each of occupants 2 allows control of air conditioner 6 dependent on the thermal sensation felt by each of occupants 2. These configurations can further improve the degree of comfort for occupant 2.

When occupant 2 performs an operation such as changing the preset temperature, the air flow direction, or the fan speed of air conditioner 6, setting unit 14 (processing unit 5) may obtain air-conditioning operation signal 40 indicating that occupant 2 has operated air conditioner 6, and the threshold value set in setting unit 14 may be changed according to the operation performed by occupant 2 on air conditioner 6. This configuration makes it possible to change the criterion for the estimation of the thermal sensation, allowing the degree of comfort for occupant 2 to further improve.

Note that although background temperature 33 is detected using temperature sensor 4 in exemplary embodiment 1, occupant temperature 31 and background temperature 33 may be detected by distinguishing occupant 2 and the background from each other on the result of detection by temperature sensor 3 without using temperature sensor 4.

In other words, processing unit 5 may detect background temperature 33 from the output of temperature sensor 3. With this configuration, there is no need to provide temperature sensor 4, and air-conditioning control device 1 can be provided at low cost.

A threshold value is set in processing unit 5, and when the amount of a change in the result of detection by temperature sensor 3 within a predetermined period of time is greater than this threshold value, the clothing amount of occupant 2 is determined to have been changed.

Exemplary Embodiment 2

Air-conditioning control device 21 according to exemplary embodiment 2 will be described below with reference to the drawings.

Note that the present exemplary embodiment is different from exemplary embodiment 1 in that processing unit 5 further includes portion determining unit 22. In exemplary embodiment 2, elements equivalent to those in exemplary embodiment 1 will be assigned the same reference marks and description of such elements may be omitted.

FIG. 5 is a block diagram illustrating a configuration of air-conditioning control device 21 according to exemplary embodiment 2.

Air-conditioning control device 21 illustrated in FIG. 5 is installed inside vehicle 8 (illustrated in FIG. 2), as in exemplary embodiment 1. Air-conditioning control device 21 includes temperature sensor 3, temperature sensor 4, processing unit 5, and control unit 7. Temperature sensor 3 detects occupant temperature 31. Temperature sensor 4 detects background temperature 33. Processing unit 5 estimates, from the result of detection by temperature sensor 3 (occupant temperature 31), the thermal sensation felt by occupant 2. The output of air conditioner 6 is controlled by control unit 7 according to the thermal sensation estimated by processing unit 5.

As illustrated in FIG. 5, processing unit 5 according to exemplary embodiment 2 includes computing unit 13, setting unit 14, clothing amount determining unit 15, portion determining unit 22, and correcting unit 16. On the basis of the temperature distribution detected by temperature sensor 3, computing unit 13 estimates the thermal sensation felt by occupant 2. A threshold value to be used in the estimation of the thermal sensation is set in setting unit 14.

Clothing amount determining unit 15 determines a change in the clothing amount of occupant 2. Portion determining unit 22 determines a portion of occupant 2.

Next, the estimation of the thermal sensation by processing unit 5 and the control of the output of air conditioner 6 will be described.

First, temperature sensor 3 detects a temperature distribution of occupant 2. When there are two or more occupants 2, the average temperature of occupants 2 (hereinafter described as occupant temperature 31) is calculated from the obtained temperature distribution. Temperature sensor 4 detects background temperature 33.

Next, portion determining unit 22 determines the upper body and the lower body of occupant 2. Portion determining unit 22 determines the upper body and the lower body from the shape of the temperature distribution of occupant 2.

Next, on the basis of the result of detection by temperature sensor 3 (occupant temperature 31) and the result of detection by temperature sensor 4 (background temperature 33), computing unit 13 estimates the thermal sensation felt in each portion of occupant 2.

Next, the output of air conditioner 6 is controlled on the basis of the result of estimation of the thermal sensation. When the thermal sensation felt by occupant 2 is "hot", the temperature setting on air conditioner 6 is decreased or the cooling fan speed is raised, for example. When the thermal sensation felt by occupant 2 is "cold", the temperature setting on air conditioner 6 is increased or the heating fan speed is raised, for example. By controlling air conditioner 6 in this way, it is possible to improve the degree of comfort for occupant 2.

When processing unit 5 estimates the thermal sensation or when control unit 7 controls the output of air conditioner 6, portion determining unit 22 determines putting on or taking off of clothing of occupant 2 for each of the upper body and the lower body. Subsequently, correcting unit 16 corrects the result of estimation of the thermal sensation on the basis of the result of determination by portion determining unit 22.

When the average temperature of the upper body rapidly changes, occupant 2 is determined to have put on or taken off upper body clothing. In this case, the air discharge toward the upper body and the air discharge toward the lower body are controlled differently at air conditioner 6. For example, air conditioner 6 is controlled so that only the fan speed for air discharge from an air outlet in an upper part of the dashboard is adjusted while the air discharge toward the space at the level of occupants' feet is maintained without adjustments.

For example, when the average temperature of the lower body rapidly changes as a result of a blanket being placed over the occupant's lap or for other reasons, air conditioner 6 is controlled so that only the fan speed for the air discharge to the space at the level of occupants' feet while the air discharge toward the upper body is maintained without adjustments. In this way, air conditioner 6 is controlled depending on the thermal sensation felt in each of the upper body and the lower body, and thus it is possible to improve the degree of comfort for occupant 2.

Although portion determining unit 22 determines the upper body and the lower body in exemplary embodiment 2, the upper body may be determined in more detail; a change in the clothing amount of each of the head, upper right body, and upper left body portions may be determined, and the thermal sensation felt in each portion may be estimated. The detailed determination of the upper body is also based on the shape of the temperature distribution as in the determination of the upper body and the lower body.

By estimating the thermal sensation felt in each portion, i.e., the head, the right body, and the right body, of the upper body, it is possible to control air conditioner 6 in further detail. When occupant 2 puts on or takes off clothing, the average temperature of the right body and the average temperature of the left body change to the same extent. Therefore, for example, when only the average temperature of the right body changes, processing unit 5 determines that the average temperature of the right body has changed by influences such as solar radiation and air discharged from air conditioner 6. With such determination, the result of estimation of the thermal sensation is not corrected.

In this way, it is possible to more accurately determine clothing being worn, by determining not only the upper body and the lower body, but also the head, the right body, and the left body of the upper body, as portions of occupant 2, and thus the degree of comfort for occupant 2 can be further improved.

Specifically, processing unit 5 determines the upper body and the lower body of occupant 2 from the result of detection by temperature sensor 3. Furthermore, processing unit 5 estimates, from the result of detection by temperature sensor 3, the thermal sensation felt in the upper body and the thermal sensation felt in the lower body.

Processing unit 5 may determine each of the head, the upper right body, and the upper left body of occupant 2 from the result of detection for the upper body included in the result of detection by temperature sensor 3. Subsequently, processing unit 5 estimates the thermal sensation felt in the head, the thermal sensation felt in the upper right body, and the thermal sensation felt in the upper left body.

Furthermore, processing unit 5 may determine a change in the clothing amount according to the result of estimation of the thermal sensation felt in the upper right body and the result of estimation of the thermal sensation felt in the upper left body.

A threshold value may be set in processing unit 5, and when only one of the result of detection for the upper right body and the result of detection for the upper left body is greater than this threshold value, the clothing amount of occupant 2 may be determined to have not been changed.

Exemplary Embodiment 3

An air-conditioning control device according to exemplary embodiment 3 will be described below with reference to the drawings.

Figure 6:
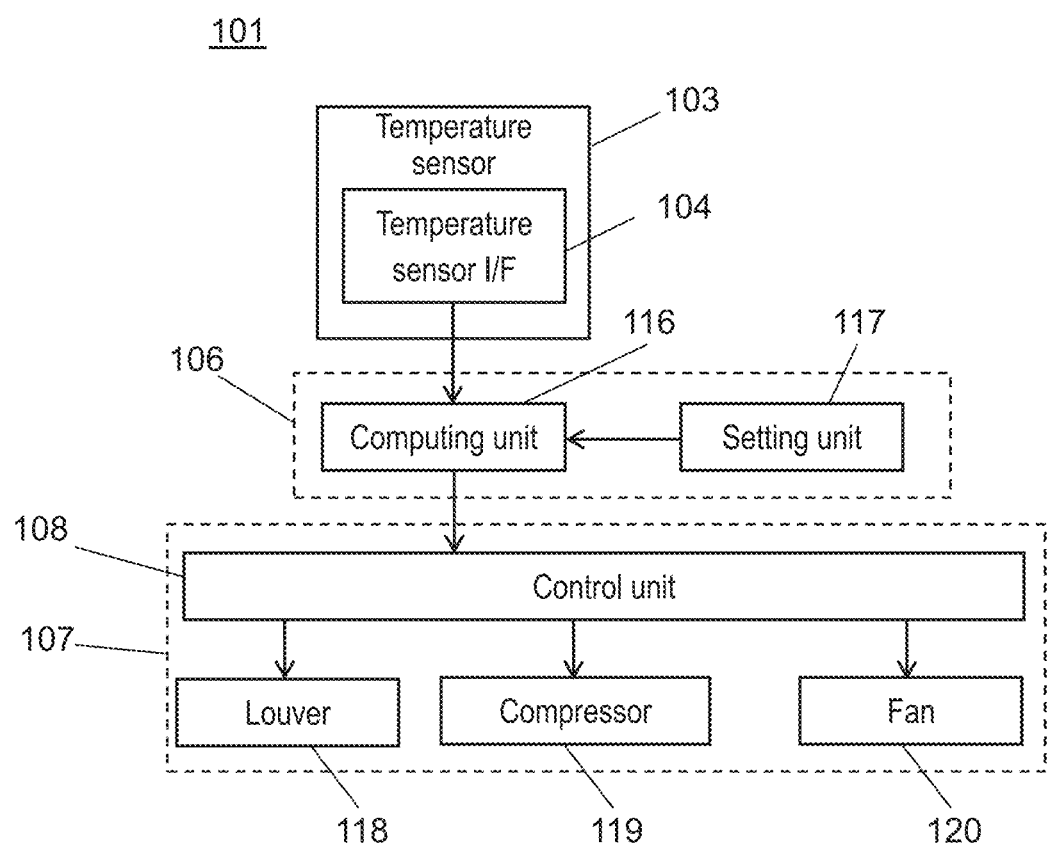
FIG. 6 is a block diagram illustrating an air-conditioning control device according to exemplary embodiment 3.
Figure 7:
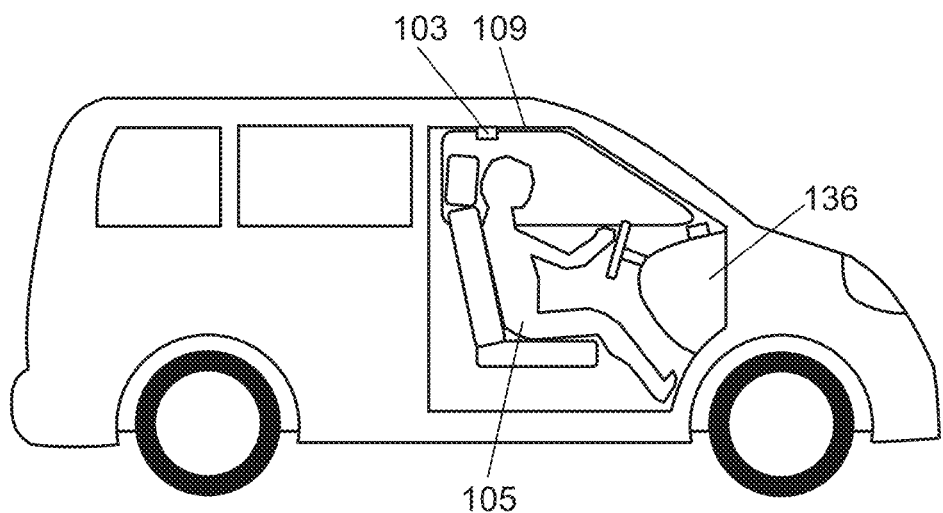
FIG. 7 illustrates a vehicle in which an air-conditioning control device according to exemplary embodiment 3 is provided.

FIG. 6 is a block diagram illustrating a configuration of air-conditioning control device 101 according to exemplary embodiment 3, and FIG. 7 illustrates vehicle 102 in which air-conditioning control device 101 is provided.

Air-conditioning control device 101 according to exemplary embodiment 3 includes: temperature sensor 103 installed in vehicle 102; processing unit 106; and air conditioner 107. Temperature sensor 103 includes temperature interface circuit 104 (hereinafter referred to as temperature sensor I/F 104), and processing unit 106 estimates, from the output of temperature sensor I/F 104, the thermal sensation felt by occupant 105 (whether occupant 105 feels hot or cold). Air conditioner 107 includes control unit 108 and controls air conditioner 107 on the basis of the result of estimation of the thermal sensation by processing unit 106.

Temperature sensor 103 according to exemplary embodiment 3 is configured using an infrared sensor. The infrared sensor (temperature sensor 103) includes a thermal infrared detection unit in which temperature sensing units are embedded, and each of the temperature sensing units includes a thermoelectric conversion unit configured using a thermopile that converts, into electrical energy, thermal energy of infrared rays radiated from a detection subject.

In the infrared sensor (temperature sensor 3), a×b pixel units 112 (non-contact infrared sensing elements) including the temperature sensing units and MOS transistors for drawing the output voltages of the temperature sensing units are arranged on the side of one surface of a semiconductor substrate in a two-dimensional array with "a" rows and "b" columns. As illustrated in FIG. 8B, pixel units 112 according to exemplary embodiment 3 form a matrix of eight rows and eight columns.

Temperature sensor 103 is installed on ceiling 109 of vehicle 102, as illustrated in FIG. 7. Temperature sensor 103 is scanned so that the driver seat and the passenger seat are included in the detection region of temperature sensor 103 to enable detection of occupant 105 (such as a driver or an occupant on the passenger seat) who is a detection subject for temperature sensor 103. Note that temperature sensor 103 may be installed not only on ceiling 109, but also anywhere including a window or a pillar (a column portion of vehicle 102) as long as occupant 105 is detected from such location.

Figure 8A:
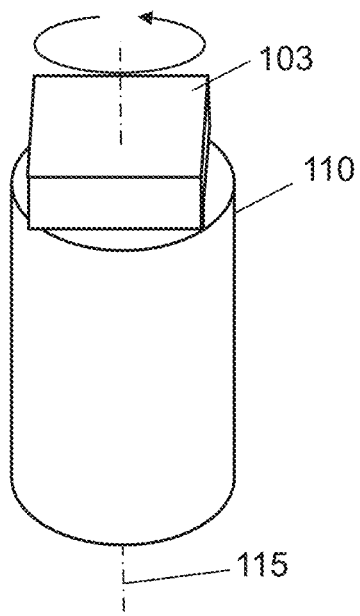
FIG. 8A illustrates scanning of a temperature sensor of an air-conditioning control device.
Figure 8B:
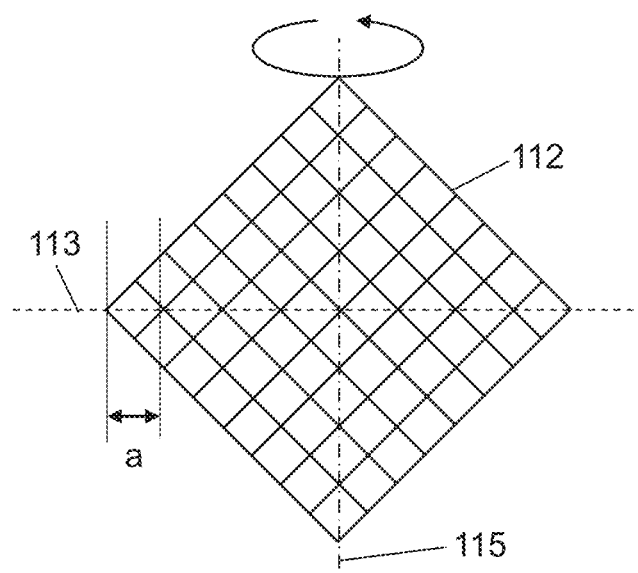
FIG. 8B is a magnified view of pixel units of the temperature sensor illustrated in FIG. 8A.
Figure 9:
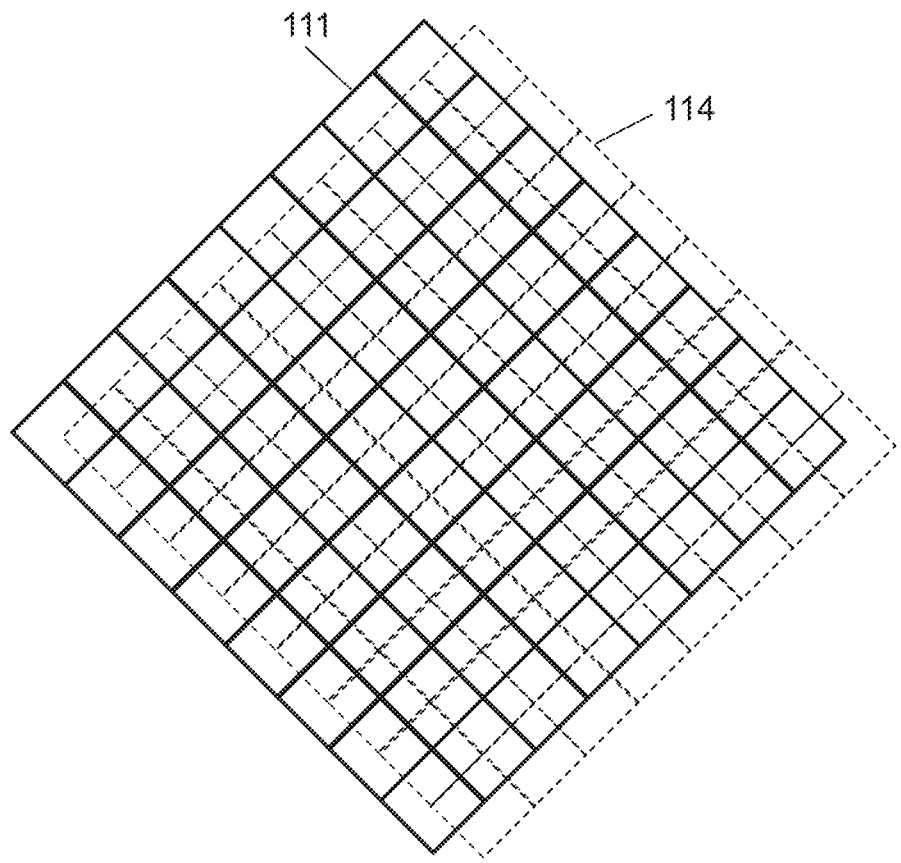
FIG. 9 illustrates a detection region of a temperature sensor.

FIG. 8A illustrates temperature sensor 103 being scanned by scanning unit 110. FIG. 8B illustrates a magnified view of pixel units 112 of the temperature sensor 103 which is to be scanned. FIG. 9 illustrates detection region 111 of scanned temperature sensor 103. In FIG. 9, the dashed lines indicate post-scanning detection region 114 of temperature sensor 103 when pixel units 112 are scanned only a half of length "a" of pixel unit 112 along long axis 113 thereof (the longest part of pixel unit 112).

Scanning unit 110 is configured using a motor or the like. Scanning unit 110 causes temperature sensor 3 to rotate about rotating axis 115 distance "b" at a constant time interval along long axis 113 of pixel unit 112. Temperature sensor 103 is scanned until a predetermined area is entirely included in the detection region of temperature sensor 103. Accordingly, pixel units 112 rotate on rotating axis 115 about rotating axis 115. Temperature sensor 103 detects infrared rays every time it is scanned, and computing unit 116 obtains a temperature distribution by adding up the temperature distributions output from temperature sensor I/F 104 after the scanning is completed.

In the present exemplary embodiment, every time temperature sensor 103 is scanned distance "b" ("b" is an arbitrary value), computing unit 116 adds up the plurality of temperature distributions obtained. Subsequently, a temperature distribution obtained by adding up these temperature distributions is used in the processing. Thus, in the present exemplary embodiment, it is possible to obtain an improved resolution, resulting in a more detailed temperature distribution compared to when the temperature distribution is obtained without scanning temperature sensor 103. When a high-resolution temperature distribution is obtained in this way, it is possible to separate the temperature of occupant 105 and the background temperature of a seat or the like, allowing accurate measurement of the temperature of occupant 105. Obtaining a high-resolution temperature distribution makes it possible to distinguish occupants 105 from each other (for example, distinguish a driver and an occupant on the passenger seat side from each other).

Note that temperature sensor 103 the scanning of which has been completed is then scanned in the opposite direction to detect infrared rays every time it is scanned distance "b" in the same manner as when the high-resolution temperature distribution is first obtained, and a next high-resolution temperature distribution is obtained after the scanning in the opposite direction is completed.

Note that distance "b" temperature sensor 103 is scanned is preferably ¼ of length "a" of pixel unit 112 along long axis 113 thereof. When distance "b" temperature sensor 103 is scanned is set to a/4, it is possible to detect details of occupant 105, and the time required to obtain a temperature distribution can be shortened.

Processing unit 106 includes computing unit 116 and setting unit 117. Computing unit 116 estimates a thermal sensation on the basis of the temperature distribution obtained by temperature sensor 103. A threshold value to be used in the estimation of the thermal sensation is set in setting unit 117.

Air conditioner 107 includes control unit 108, louver 118, and fan 120. Control unit 108 controls air conditioner 107. Louver 118, compressor 119, and fan 120 are connected to control unit 108. According to the output of computing unit 116, control unit 108 controls louver 118, compressor 119, and fan 120. In this way, the air-conditioning by air conditioner 107 is controlled.

Figure 10:
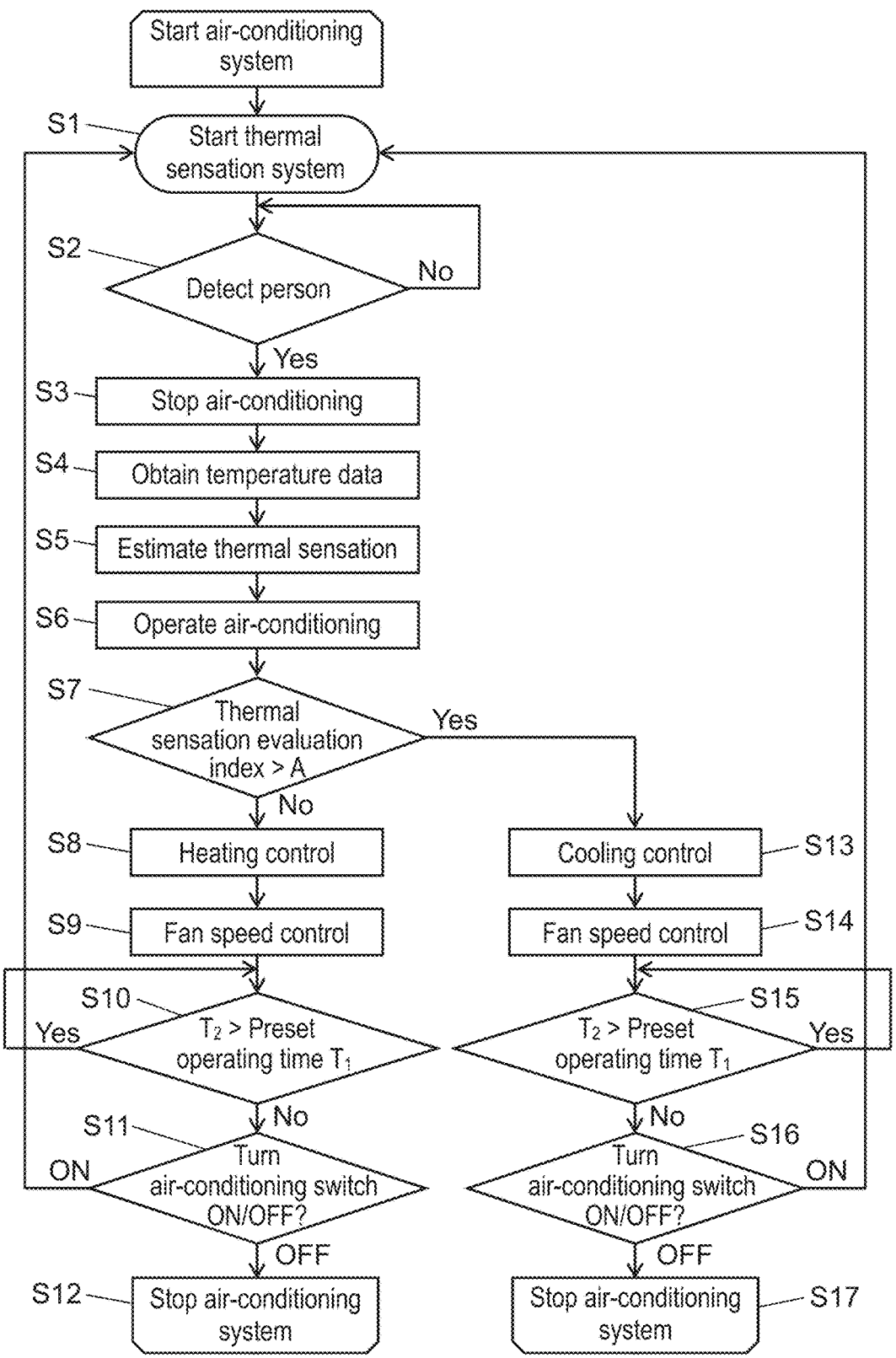
FIG. 10 is a flowchart of a thermal sensation system according to exemplary embodiment 3.

Next, the air conditioning control performed by air-conditioning control device 101 will be described. FIG. 10 is a flowchart of a thermal sensation system according to exemplary embodiment 3.

First, in Step S1, a thermal sensation system is started. An air-conditioning system is started at the start of the engine of vehicle 102.

Next, in Step S2, temperature sensor 103 detects occupant 105. When occupant 105 (any person) is not detected in Step S2, the process returns to Step S2 for detecting occupant 105 after predetermined time elapses.

When occupant 105 is detected in Step S2, air-conditioning of air conditioner 6 is stopped in Step S3. Temperature sensor 103 obtains temperature data in Step S4, and the thermal sensation is estimated in Step S5. The air-conditioning operation is started in Step S6.

The temperature of occupant 105 and the background temperature of a seat or the like are determined from the temperature distribution detected by temperature sensor 103, and the average value of the temperatures of occupants 105 (hereinafter described as "occupant temperature") is calculated. Subsequently, processing unit 106 estimates a thermal sensation from the occupant temperature and the background temperature. Here, the thermal sensation has preset stages such as "hot", "very hot", "cold", "very cold", and "pleasant" according to how occupant 105 feels as the thermal sensation.

Next, in Step S7, a thermal sensation evaluation index which is a threshold value stored in setting unit 117 and the result of estimation of the thermal sensation are compared. The process proceeds to Step S8 when the thermal sensation evaluation index is less than or equal to predetermined threshold value "A", and the process proceeds to Step S13 when the thermal sensation evaluation index is greater than or equal to predetermined threshold value "A".

In Step S8, control unit 108 controls air conditioner 107 so that air conditioner 107 functions as a heating system. In Step S13, control unit 108 controls air conditioner 107 so that air conditioner 107 functions as a cooling system.

In other words, control unit 108 controls air conditioner 107 so that the output thereof changes according to the result of estimation of the thermal sensation by processing unit 106.

Specifically, the output of air conditioner 107 is changed according to the result of estimation of the thermal sensation so that air conditioner 107 outputs warm air by functioning as a heating system or outputs cool air by functioning as a cooling system, for example.

In the present exemplary embodiment, processing unit 106 changes the output to air conditioner 107 in the period between when scanning unit 110 completes scanning and when scanning unit 110 starts next scanning.

Next, in Step S9, the fan speed of air conditioner 107 functioning as a heating system is controlled according to a signal output from control unit 108. In Step S10, preset operating time $T_1$ which has elapsed since the fan speed was controlled is compared with control stoppage time $T_2$ set in control unit 108. The control of air conditioner 107 is stopped when $T_1 < T_2$, and the process proceeds to next Step 11 when $T_1 > T_2$. In this way, the period of time during which the air conditioning is not controlled is provided, making it possible to keep occupant 105 from feeling discomfort due to frequent control of air conditioner 107. Preset operating time $T_1$ and control stoppage time $T_2$ may be set as appropriate according to the conditions of use of air-conditioning control device 1.

Next, in Step S11, whether or not to stop air conditioner 107 is determined. The process proceeds to Step S12 when it is determined that air conditioner 107 is to be stopped, and the process returns to Step S1 when it is determined that air conditioner 107 is not to be stopped. Air conditioner 107 is stopped in Step S12.

Furthermore, when the thermal sensation evaluation index is greater than or equal to predetermined threshold value "A" in Step S7, control unit 108 controls air conditioner 107 in Step S13 so that air conditioner 107 functions as a cooling system.

In Step S14, the fan speed of air conditioner 107 functioning as a cooling system is controlled according to a signal from control unit 108. In Step S15, preset operating time $T_1$ which has elapsed since the fan speed was controlled is compared with control stoppage time $T_2$ set in control unit 108, and the control of air conditioner 107 is stopped when $T_1 < T_2$, and the process proceeds to next Step S16 when $T_1 > T_2$. In this way, the period of time during which air conditioner 107 does not discharge air is provided, making it possible to keep occupant 105 from feeling discomfort due to frequent control of air conditioner 107. Preset operating time $T_1$ and control stoppage time $T_2$ may be set as appropriate according to the conditions of use of air-conditioning control device 1.

Next, in Step S16, whether or not to stop air conditioner 107 is determined. The process proceeds to Step S17 when it is determined that air conditioner 107 is to be stopped, and the process returns to Step S1 when it is determined that air conditioner 107 is not to be stopped. Air conditioner 107 is stopped in Step S17.

In exemplary embodiment 3, after air conditioner 107 is stopped in Step S3, temperature data is obtained in Step S4, and the thermal sensation is estimated in Step S5.

In other words, in the present exemplary embodiment, control unit 108 can control air conditioner 107 so that the operation of air conditioner 107 is suspended during the period in which processing unit 106 estimates the thermal sensation.

Furthermore, after the start of the operation of air conditioner 107 in Step S6, air conditioner 107 is controlled in the process following step S8 to reflect the result of estimation of the thermal sensation.

Assume that air conditioner 107 is in operation; for example, assume that air conditioner 107 is discharging warm air. At this time, only the temperature of a portion of occupant 105 on which the warm air blows increases, which may lead to an undesirable result of estimation of the thermal sensation that is one stage higher on the "hot" side than the actual thermal sensation. It is, however, possible to prevent the average temperature of occupant 105 from being detected as a temperature higher than the actual average temperature thereof by suspending the operation of air conditioner 107 during the period in which the thermal sensation is estimated as in exemplary embodiment 3. Thus, the temperature of occupant 105 can be accurately detected, allowing for accurate estimation of the thermal sensation felt by occupant 105. Consequently, air-conditioning control device 101 according to the present exemplary embodiment can improve the degree of comfort for occupant 105.

Note that although air conditioner 107 is stopped in Step S3 in exemplary embodiment 3 described above, the fan speed of air conditioner 7 may be reduced instead of stopping air conditioner 107. A reduction in the accuracy of estimating the thermal sensation due to the influence of air discharged from air conditioner 107 can be prevented only by reducing the fan speed of air conditioner 107 instead of completely stopping air conditioner 107. It is possible to improve the accuracy of estimating the thermal sensation while preventing the interior of vehicle 102 from becoming cold or hot during the period in which processing unit 106 estimates the thermal sensation. In this way, reducing the fan speed of air conditioner 107 makes it possible to improve the accuracy of estimating the thermal sensation without deteriorating the degree of comfort for occupant 105.

In other words, control unit 108 may control air conditioner 107 so that air conditioner 107 has a reduced fan speed during the period in which processing unit 106 estimates the thermal sensation.

After the control for improving the accuracy of estimating the thermal sensation by stopping or reducing the air discharge from air conditioner 107, the control for improving the accuracy of estimating the thermal sensation may be avoided until temperature sensor 103 is scanned several times (at least twice, preferably 10 times).

In other words, in the present exemplary embodiment, processing unit 106 does not need to estimate the thermal sensation until the scanning of temperature sensor 103 is completed at least twice after control unit 108 controls air conditioner 107 according to the thermal sensation.

As described above, frequent control of air conditioner 107 such as stoppage, a reduction in the fan speed, and a change in the air flow direction is avoided by temporarily suspending the control of air conditioner 107 for improving the accuracy of estimating the thermal sensation. Thus, it is possible to keep occupant 105 from feeling discomfort due to frequent air-conditioning control.

Furthermore, in exemplary embodiment 3, a high-resolution temperature distribution is obtained through scanning of temperature sensor 103 in one direction, and a next high-resolution temperature distribution is obtained through scanning in the opposite direction after the scanning of temperature sensor 103 in one direction is completed. However, the operation is not limited to this operation. For example, one high-resolution temperature distribution may be obtained by adding up temperature distributions resulting from reciprocating scanning of temperature sensor 103, and the thermal sensation may be estimated using the obtained temperature distribution. Another example may be obtaining one high-resolution temperature distribution after two or more reciprocating movements of scanning of temperature sensor 103 and estimating the thermal sensation using the obtained temperature distribution. By increasing the number of times temperature sensor 103 is scanned until a high-resolution temperature distribution is obtained, and adding up many temperature distributions to obtain a high-resolution temperature distribution, a higher-resolution temperature distribution can be obtained. It is possible to perform accurate control as a result of obtaining a higher-resolution temperature distribution. Note that the number of scanning times for obtaining a high-resolution temperature distribution may be set as appropriate according to the conditions of use of the air-conditioning control device.

Exemplary Embodiment 4

Next, air-conditioning control device 121 according to exemplary embodiment 4 will be described below with reference to the drawings.

Figure 11:
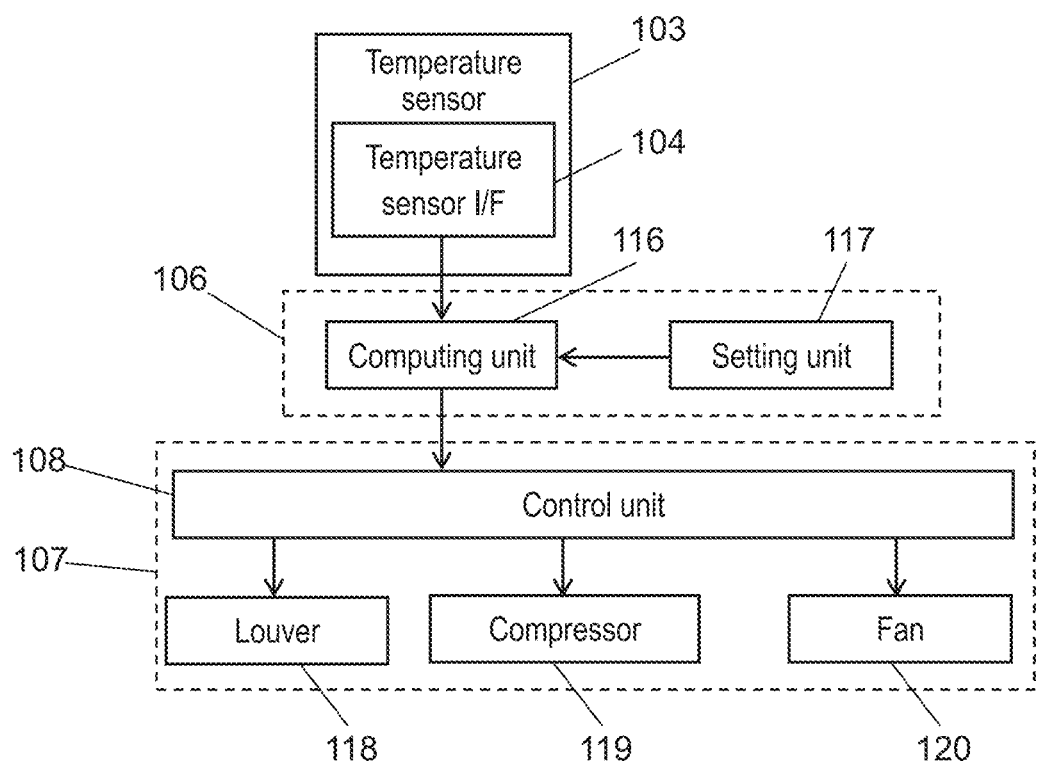
FIG. 11 is a block diagram illustrating an air-conditioning control device according to exemplary embodiment 4.

FIG. 11 is a block diagram illustrating a configuration of air-conditioning control device 121 according to exemplary embodiment 4.

Air-conditioning control device 121 according to exemplary embodiment 4 includes: temperature sensor 103 including temperature sensor I/F 104; processing unit 106; and air conditioner 107. Temperature sensor 103 is installed in vehicle 102. Processing unit 106 estimates, from the output of temperature sensor I/F 104, the thermal sensation felt by occupant 105. Control unit 108 controls air conditioner 107 on the basis of the result of estimation of the thermal sensation by processing unit 106.

Figure 12:
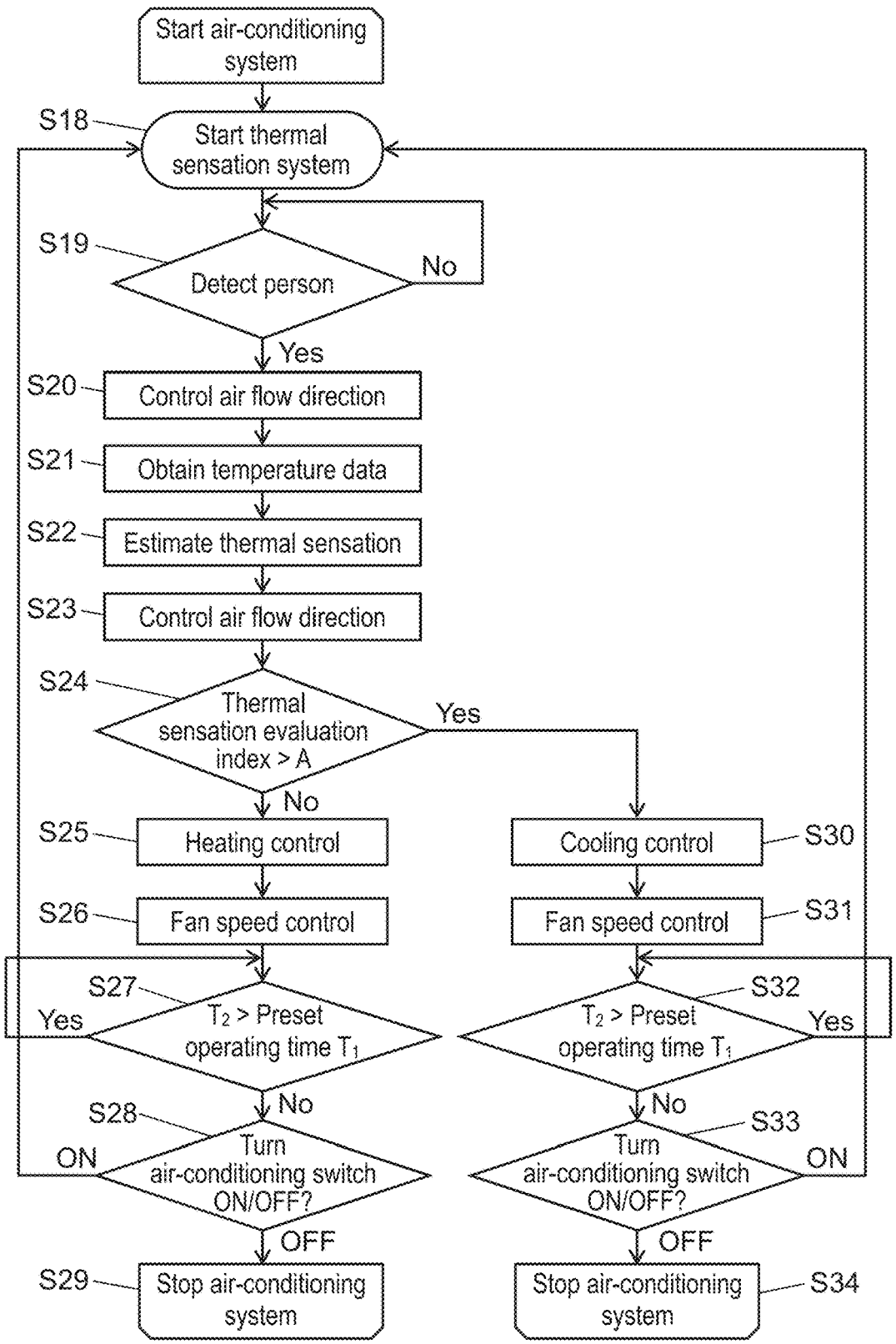
FIG. 12 is a flowchart of a thermal sensation system according to exemplary embodiment 4.

Next, a method for controlling air conditioner 107 of air-conditioning control device 121 according to exemplary embodiment 4 will be described. FIG. 12 illustrates a flowchart of a thermal sensation system according to exemplary embodiment 4.

First, in Step S18, a thermal sensation system is started.

Next, in Step S19, temperature sensor 103 detects occupant 105. When occupant 105 is not detected, the process returns to Step S19 for detecting occupant 105 after predetermined time elapses.

Next, when occupant 105 (any person) is detected in Step S19, the air flow direction for air conditioning is controlled in Step S20 so that air does not blow on occupant 105. Temperature sensor 103 obtains temperature data in Step S21, the thermal sensation is estimated in Step S22, and the air flow direction for air conditioning is restored in Step S23.

Specifically, control unit 108 controls air conditioner 107 so that the air flow of air conditioner 107 is directed to where occupant 105 is absent during the period in which processing unit 106 estimates the thermal sensation.

Next, in Step S24, a thermal sensation evaluation index which is a threshold value stored in setting unit 117 and the result of estimation of the thermal sensation are compared. The process proceeds to Step S25 when the thermal sensation evaluation index is less than or equal to predetermined threshold value "A", and the process proceeds to Step S30 when the thermal sensation evaluation index is greater than or equal to predetermined threshold value "A".

In Step S25, control unit 108 controls air conditioner 107 so that air conditioner 107 functions as a heating system. Furthermore, in Step S26, the fan speed of air conditioner 107 functioning as a heating system is controlled according to a signal output from control unit 108. In Step S27, preset operating time $T_1$ which has elapsed since the fan speed was controlled is compared with control stoppage time $T_2$ set in control unit 108. The control of air conditioner 107 is stopped when $T_1 < T_2$, and the process proceeds to next Step 28 when $T_1 > T_2$.

Next, in Step S28, whether or not to stop air conditioner 107 is determined. The process proceeds to Step S29 when it is determined that air conditioner 107 is to be stopped, and the process returns to Step S18 when it is determined that air conditioner 107 is not to be stopped. The air-conditioning system of air conditioner 107 is stopped in Step S29.

Furthermore, when the thermal sensation evaluation index is greater than or equal to predetermined threshold value "A" in Step S24, control unit 108 controls air conditioner 107 in Step S30 so that air conditioner 107 functions as a cooling system. In Step S31, the fan speed of air conditioner 107 functioning as a cooling system is controlled according to a signal from control unit 108. In Step S32, preset operating time $T_1$ which has elapsed since the fan speed was controlled is compared with control stoppage time $T_2$ set in control unit 108. The air conditioning control is stopped when $T_1 < T_2$, and the process proceeds to next Step S33 when $T_1 > T_2$. In this way, the period of time during which air conditioner 107 does not discharge air is provided, making it possible to keep occupant 105 from feeling discomfort due to frequent control of air conditioner 107. Preset operating time $T_1$ and control stoppage time $T_2$ may be set as appropriate according to the conditions of use of air-conditioning control device 101.

Next, in Step S33, whether or not to stop air conditioner 107 is determined. Here, the process proceeds to Step S34 when it is determined that air conditioner 107 is to be stopped, and the process returns to Step S18 when it is determined that air conditioner 107 is not to be stopped. The air-conditioning system of air conditioner 107 is stopped in Step S34.

In exemplary embodiment 4, by changing the air flow direction for air conditioning so that air does not blow on occupant 105, a reduction in the accuracy of estimating the thermal sensation due to the influence of air discharged from air conditioner 107 can be prevented without changing the inside temperature of vehicle 102. Such control makes it possible to improve the accuracy of estimating the thermal sensation without deteriorating the degree of comfort for occupant 105.

Exemplary Embodiment 5

Air-conditioning control device 131 according to exemplary embodiment 5 will be described below with reference to the drawings.

Figure 13:
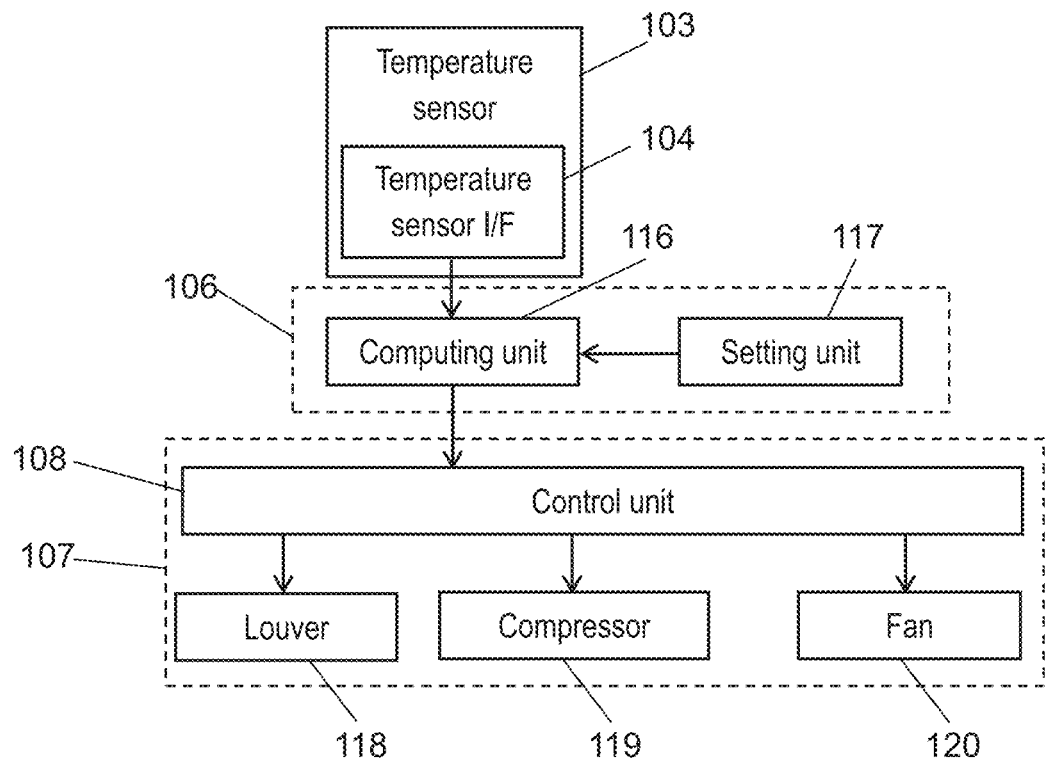
FIG. 13 is a block diagram illustrating an air-conditioning control device according to exemplary embodiment 5.
Figure 14:
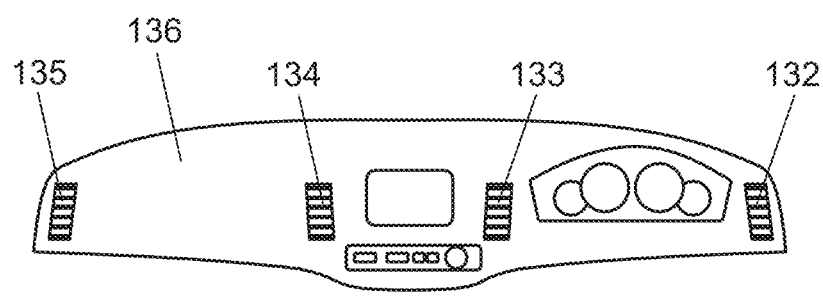
FIG. 14 is a front view of a dashboard according to exemplary embodiment 5.

FIG. 13 is a block diagram illustrating a configuration of air-conditioning control device 131 according to exemplary embodiment 5, and FIG. 14 is a front view of dashboard 136 having air outlets of air conditioner 107.

Air-conditioning control device 131 according to exemplary embodiment 5 includes: temperature sensor 103 including temperature sensor I/F 104; processing unit 106; and air conditioner 107. As illustrated in FIG. 7, temperature sensor 103 is installed in vehicle 102. Processing unit 106 estimates, from the output of temperature sensor I/F 104, the thermal sensation felt by occupant 105. Control unit 108 controls air conditioner 107 on the basis of the result of estimation of the thermal sensation by processing unit 106.

As illustrated in FIG. 14, dashboard 136 includes air outlet 132, air outlet 133, air outlet 134, and air outlet 135 of air conditioner 107 though which warm or cool air is discharged toward occupant 105. Air outlet 132 and air outlet 133 are provided on the driver seat side, and air outlet 134 and air outlet 135 are provided on the passenger seat side.

Figure 15:
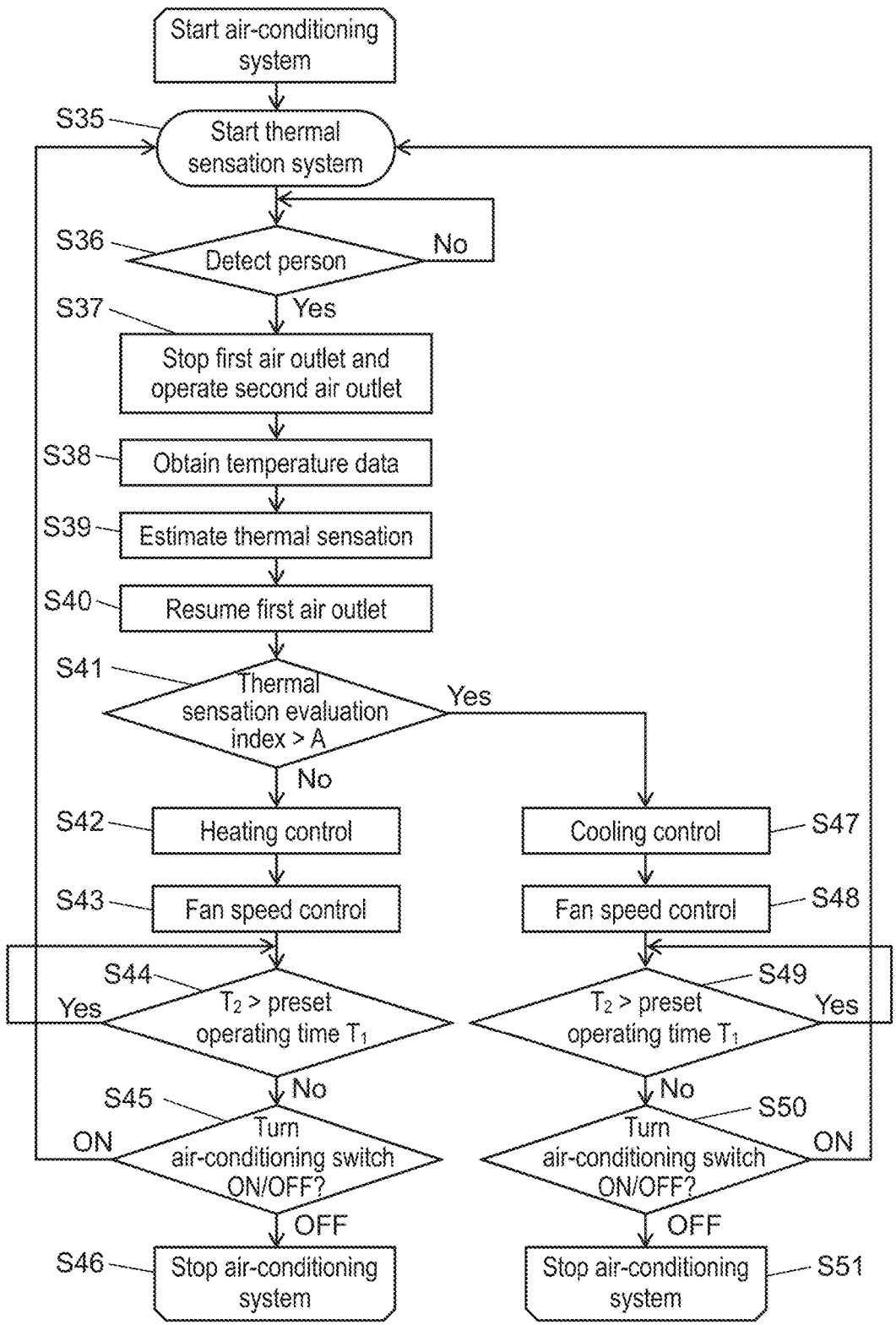
FIG. 15 is a flowchart of a thermal sensation system according to exemplary embodiment 5.

Next, a method for controlling air conditioner 107 of air-conditioning control device 131 according to exemplary embodiment 5 will be described. FIG. 15 illustrates a flowchart of a thermal sensation system according to exemplary embodiment 5.

First, in Step S35, a thermal sensation system is started.

Next, in Step S36, temperature sensor 103 detects occupant 105 (any person). When occupant 105 is not detected, the process returns to Step S36 for detecting occupant 105 after predetermined time elapses.

Next, when occupant 105 on the driver seat side is detected in Step S36, the air discharge from one of air outlet 132 and air outlet 133 is stopped in Step S37. When occupant 105 on the passenger seat side is detected in Step S36, the air discharge from one of air outlet 134 and air outlet 135 is stopped in Step S37.

When occupant 105 on the driver seat side is detected, which air outlet is to be selected from among air outlet 132 and air outlet 133 to stop discharging air is determined by selecting an air outlet having an air flow direction toward occupant 105. The same applies to air outlet 134 or air outlet 135 on the passenger seat side.

Next, a description will be given of an example in which the air discharge from air outlet 132 is stopped in Step 37 and the air discharge from air outlet 133 continues. Note that air outlet 134 and air outlet 135 are controlled in the same way.

Next, temperature sensor 103 obtains temperature data in Step S38, and the thermal sensation is estimated in Step S39. In Step S40, the air discharge from air outlet 132 which was stopped in Step S37, selected from among air outlet 132 and air outlet 133, is started. The period of time until the start of the air discharge is between when the scanning of temperature sensor 103 in one direction is completed and when the temperature distribution is obtained. With this configuration, the influence of air conditioning on the temperature distribution to be obtained can be reduced. In addition, since air conditioning is not stopped longer than necessary, it is possible to improve the accuracy of estimating the thermal sensation without causing discomfort for occupant 105.

Next, in Step S41, a thermal sensation evaluation index which is a threshold value stored in setting unit 117 and the result of estimation of the thermal sensation are compared. The process proceeds to Step S42 when the thermal sensation evaluation index is less than or equal to predetermined threshold value "A", and the process proceeds to Step S47 when the thermal sensation evaluation index is greater than or equal to predetermined threshold value "A".

In Step S42, control unit 108 controls air conditioner 107 so that air conditioner 107 functions as a heating system. Furthermore, in Step S43, the fan speed of air conditioner 107 functioning as a heating system is controlled according to a signal output from control unit 108. In Step S44, preset operating time $T_1$ which has elapsed since the fan speed was controlled is compared with control stoppage time $T_2$ set in control unit 108, and the air conditioning control is stopped when $T_1<T_2$, and the process proceeds to next Step S45 when $T_1>T_2$.

Next, in Step S45, whether or not to stop air conditioner 107 is determined. The process proceeds to Step S46 when it is determined that air conditioner 107 is to be stopped, and the process returns to Step S35 when it is determined that air conditioner 107 is not to be stopped. Air conditioner 107 is stopped in Step S46.

Furthermore, when the thermal sensation evaluation index is greater than or equal to predetermined threshold value "A" in Step S41, control unit 108 controls air conditioner 107 in Step S47 so that air conditioner 107 functions as a cooling system. In Step S48, the fan speed of air conditioner 107 functioning as a cooling system is controlled according to a signal from control unit 108. In Step S49, preset operating time $T_1$ which has elapsed since the fan speed was controlled is compared with control stoppage time $T_2$ set in control unit 108. The air conditioning control is stopped when $T_1<T_2$, and the process proceeds to next Step S50 when $T_1>T_2$. In this way, the period of time during which air conditioner 107 does not discharge air is provided, making it possible to keep occupant 105 from feeling discomfort due to frequent control of air conditioner 107. Preset operating time $T_1$ and control stoppage time $T_2$ may be set as appropriate according to the conditions of use of air-conditioning control device 1.

Next, in Step S50, whether or not to stop air conditioner 107 is determined. The process proceeds to Step S51 when it is determined that air conditioner 107 is to be stopped, and the process returns to Step S35 when it is determined that air conditioner 107 is not to be stopped. Air conditioner 107 is stopped in Step S51.

The air discharged from air outlet 132 and air outlet 133 blows on occupant 105 (driver) on the driver seat, and the air discharged from air outlet 134 and air outlet 135 blows on occupant 105 on the passenger seat. Since the air discharge from one of air outlet 132 and air outlet 133 is stopped, air blowing on occupant 105 on the driver seat is not entirely stopped. Thus, it is possible to improve the accuracy of estimating the thermal sensation without deteriorating the degree of comfort for occupant 105 on the driver seat. Likewise, the air discharge from one of air outlet 134 and air outlet 135 is stopped, and thus air blowing on occupant 105 on the passenger seat is not entirely stopped, making it possible to improve the accuracy of estimating the thermal sensation without deteriorating the degree of comfort for occupant 105 on the passenger seat.

Note that when no occupant 105 is present on the passenger seat, the air discharge from air outlet 134 and air outlet 135 does not influence the estimation of the thermal sensation and therefore does not need to be stopped.

Although the air discharge is stopped in exemplary embodiment 5, the fan speed may be reduced or the air discharge direction may be changed. This configuration makes it possible to improve the accuracy of estimating the thermal sensation without deteriorating the degree of comfort for occupant 105.

In exemplary embodiment 5, an air outlet having an air flow direction toward occupant 105 is selected as an air outlet which stops discharging air, but this implementation is not limiting; for example, an air outlet on the window side may be selected.

Furthermore, although exemplary embodiment 5 describes an implementation using air outlet 132, etc., provided in dashboard 136, exemplary embodiment 5 can be applied to the air discharge from an air outlet provided in an area other than dashboard 136, such as an air outlet directed to the space at the level of occupants' feet.

Thus, in the present exemplary embodiment, the control of air conditioner 107 can be changed for each occupant 105 according to the thermal sensation felt by occupant 105.

Exemplary Embodiment 6

An air-conditioning control device according to exemplary embodiment 6 will be described below with reference to the drawings.

Note that exemplary embodiment 6 describes an implementation in which infrared sensor 43 is used as the temperature sensor.

Figure 16:
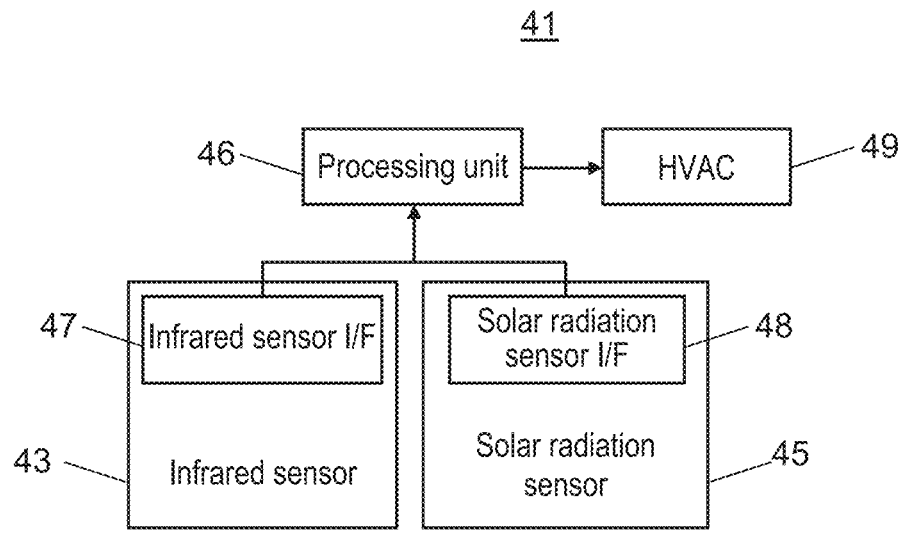
FIG. 16 is a block diagram illustrating an air-conditioning control device according to exemplary embodiment 6.
Figure 17:
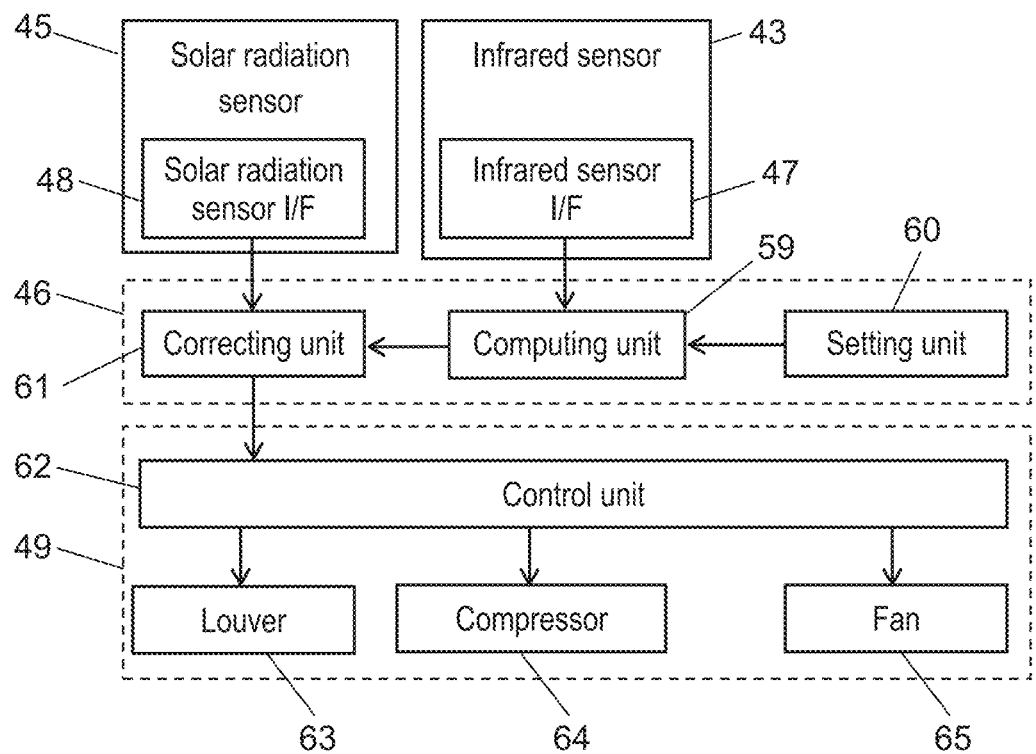
FIG. 17 is a block diagram illustrating details of an air-conditioning control device according to exemplary embodiment 6.
Figure 18:
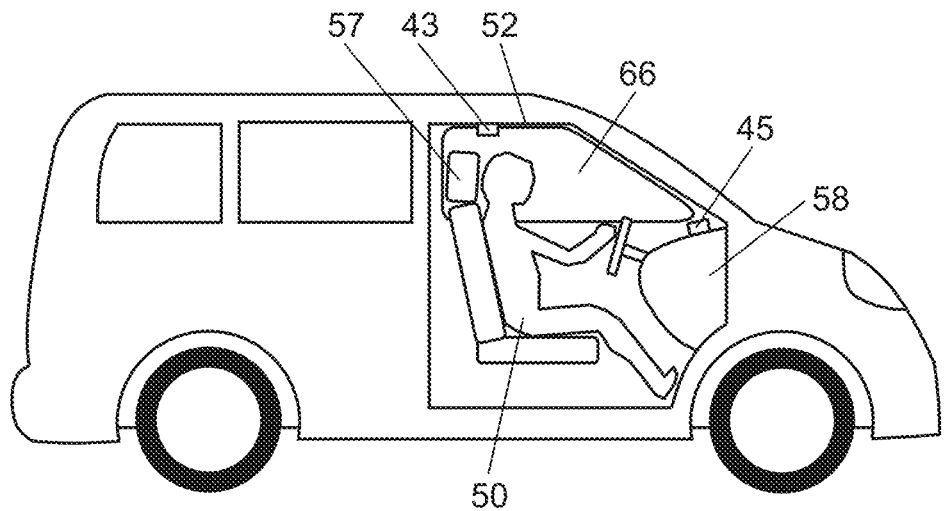
FIG. 18 illustrates a vehicle in which an air-conditioning control device according to exemplary embodiment 6 is provided.

FIG. 16 is a block diagram illustrating a configuration of air-conditioning control device 41 according to exemplary embodiment 6. FIG. 17 is a block diagram illustrating details of air-conditioning control device 41. FIG. 18 illustrates a vehicle in which air-conditioning control device 41 is provided.

Air-conditioning control device 41 according to exemplary embodiment 6 includes: infrared sensor 43 including infrared interface circuit 47 (hereinafter described as infrared sensor I/F 47); solar radiation sensor 45 including solar radiation sensor interface circuit 48 (hereinafter described as solar radiation sensor I/F 48); and processing unit 46. Infrared sensor 43 is installed in vehicle 42. Scanning unit 44 (illustrated in FIG. 19) scans infrared sensor 43. Processing unit 46 processes the output of infrared sensor 43 and the output of solar radiation sensor 45 and controls heating, ventilating and air-conditioning (HVAC) 49 provided in vehicle 42. Infrared sensor I/F 47 and solar radiation sensor I/F 48 are connected to processing unit 46. Note that "heating, ventilating and air-conditioning" means a heating system, a ventilation system, and an air-conditioning system. Air-conditioning control is performed on the basis of the output of processing unit 46.

Infrared sensor 43 includes a thermal infrared detection unit in which temperature sensing units are embedded, and each of the temperature sensing units includes a thermoelectric conversion unit configured using a thermopile that converts, into electrical energy, thermal energy of infrared rays radiated from a detection subject. In infrared sensor 43, a×b pixel units 51 (non-contact infrared sensing elements) including the temperature sensing units and MOS transistors for drawing the output voltages of the temperature sensing units are arranged on the side of one surface of a semiconductor substrate in a two-dimensional array with "a" rows and "b" columns; pixel units 51 according to exemplary embodiment 6 form a matrix of eight rows and eight columns.

Infrared sensor 43 is installed on ceiling 52 of vehicle 42. Infrared sensor 43 is scanned so that the driver seat and the passenger seat are included in detection region 53 of infrared sensor 43 (illustrated in FIG. 20) to enable detection of occupant 50 (such as a driver or an occupant on the passenger seat) who is a detection subject for infrared sensor 43.

Figure 19:
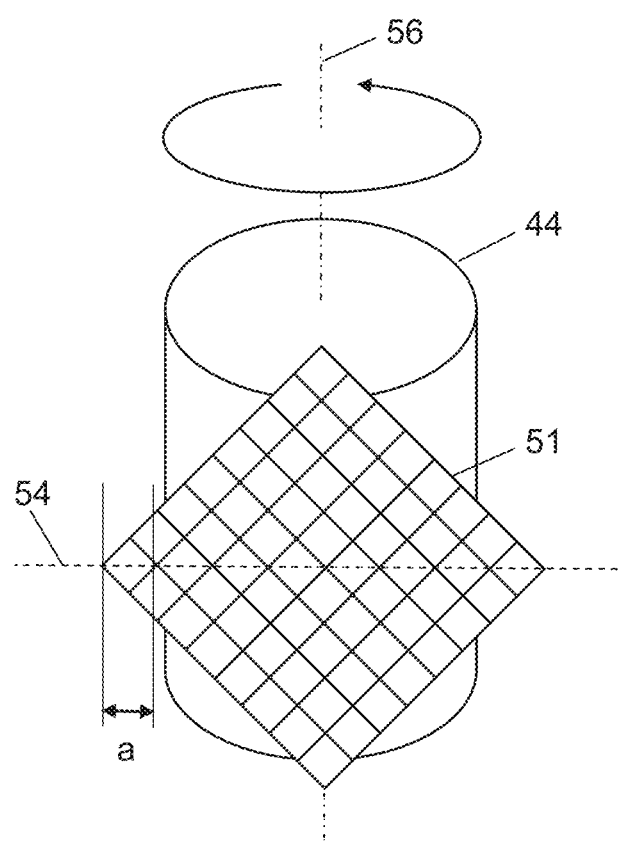
FIG. 19 illustrates scanning of an infrared sensor of an air-conditioning control device according to exemplary embodiment 6.
Figure 20:
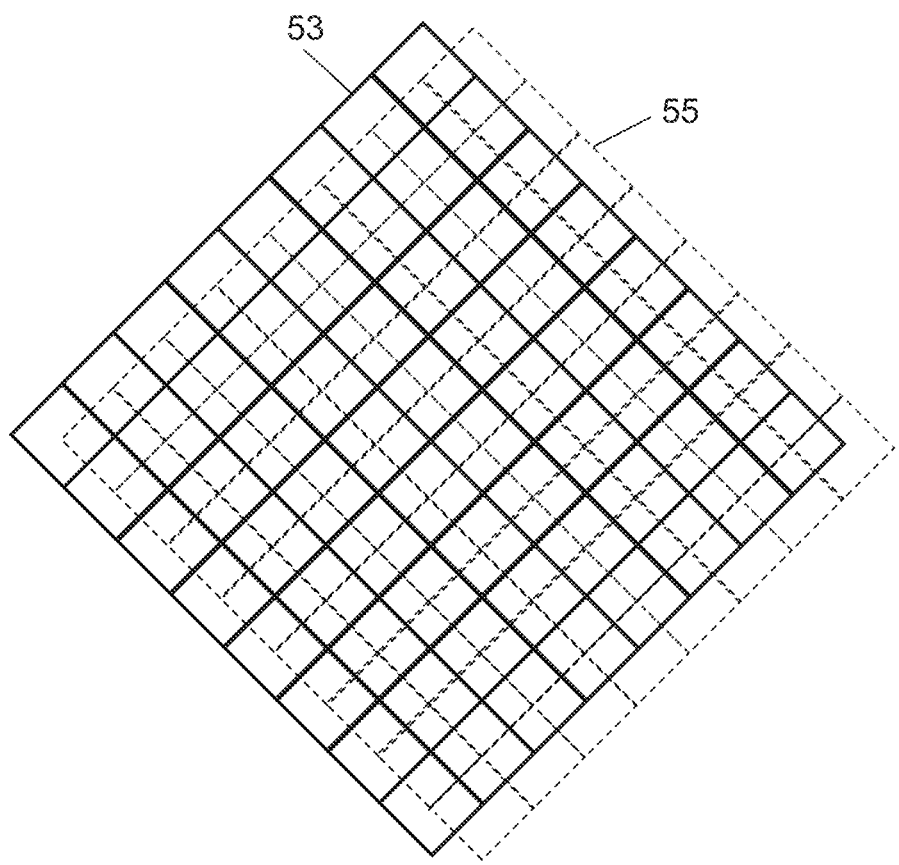
FIG. 20 illustrates a detection region of an infrared sensor of an air-conditioning control device according to exemplary embodiment 6.

FIG. 19 illustrates scanning of infrared sensor 43 performed by scanning unit 44. FIG. 20 illustrates detection region 53 of scanned infrared sensor 43. In FIG. 19, the dashed lines indicate post-scanning detection region 55 of infrared sensor 43 when pixel units 51 are scanned only a half of length "a" of pixel unit 51 along long axis 54 thereof (the longest part of pixel unit 51).

Scanning unit 44 is configured using a motor or the like and causes infrared sensor 43 to rotate about rotating axis 56 distance "b" at a constant time interval along long axis 54 of pixel unit 51 so that infrared sensor 43 is scanned until a predetermined area is entirely included in detection region 53 of infrared sensor 43. Infrared sensor 43 detects infrared rays every time it is scanned, and a temperature distribution is obtained by adding up the temperature distributions obtained by infrared sensor I/F 47 after the scanning is completed. Infrared sensor 43 the scanning of which has been completed is then scanned in the opposite direction to detect infrared rays every time it is scanned distance "b" ("b" is an arbitrary value) in the same manner, and a temperature distribution is obtained after the scanning in the opposite direction is completed.

In the present exemplary embodiment, processing unit 46 adds up a plurality of temperature distributions resulting from infrared sensor 43 being scanned distance "b" each time. Subsequently, a temperature distribution obtained by adding up the temperature distributions is used in the processing. Thus, in the present exemplary embodiment, it is possible to obtain an improved resolution, resulting in a more detailed temperature distribution compared to when the temperature distribution is obtained without scanning infrared sensor 43. When a high-resolution temperature distribution is obtained in this way, it is possible to separate the temperature of occupant 50 and the background temperature of seat 57 or the like, allowing accurate measurement of the temperature of occupant 50. Obtaining a high-resolution temperature distribution makes it possible to distinguish occupants 50 from each other (for example, distinguish a driver and an occupant on the passenger seat side from each other).

Note that distance "b" infrared sensor 43 is scanned is preferably ¼ of length "a" of pixel unit 51 along long axis 54 thereof. When distance "b" infrared sensor 43 is scanned is set to a/4, it is possible to detect details of occupant 50, and the time required to obtain a temperature distribution can be shortened.

A sensor that can measure an illuminance level, such as an illuminometer, is used as solar radiation sensor 45 and is installed on dashboard 58. Installation of solar radiation sensor 45 on dashboard 58 makes it possible to measure an illuminance level in a position close to the driver seat or the passenger seat.

Processing unit 46 includes: computing unit 59 which estimates the thermal sensation on the basis of the temperature distribution obtained by infrared sensor 43; setting unit 60 in which a threshold value to be used in the estimation of the thermal sensation is set; and correcting unit 61 which corrects the result of estimation of the thermal sensation.

HVAC 49 includes: control unit 62 which controls HVAC 49; and louver 63, compressor 64, and fan 65 which are connected to control unit 62. Control unit 62 controls louver 63, compressor 64, and fan 65 according to the output of correcting unit 61, thereby controlling air conditioning of HVAC 49.

Specifically, the air-conditioning control device according to the present exemplary embodiment includes: scanning unit 44 which scans infrared sensor 43; and solar radiation sensor 45 which detects an interior illuminance level. Subsequently, processing unit 46 estimates, from the output of infrared sensor 43, the thermal sensation felt by occupant 50. Furthermore, processing unit 46 includes correcting unit 61 which corrects the result of estimation of the thermal sensation using the output of solar radiation sensor 45. Control unit 62 controls the air conditioner (HVAC 49) according to the output from correcting unit 61.

Next, the air conditioning control performed by air-conditioning control device 41 will be described.

Figure 21:
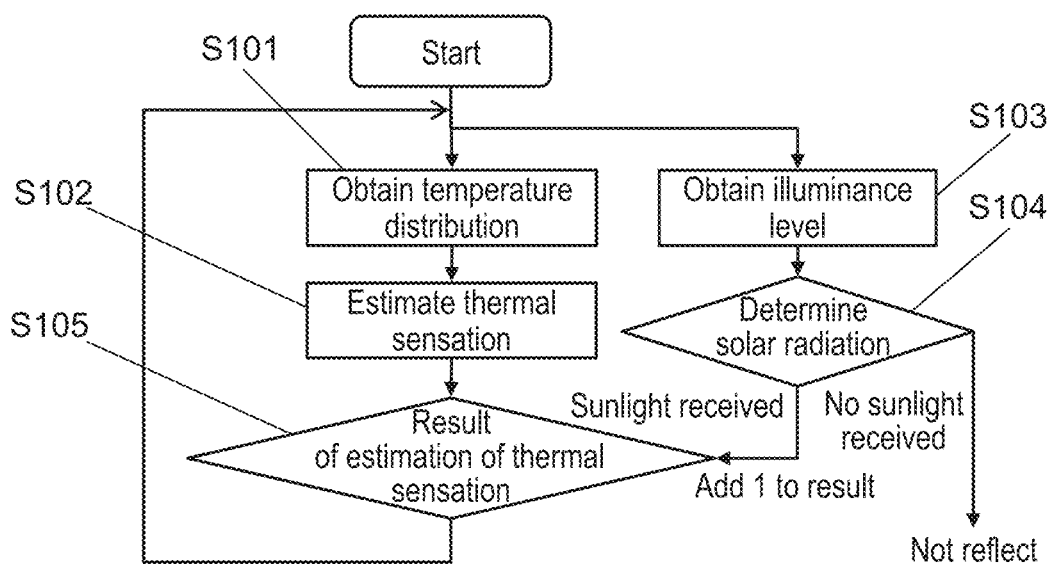
FIG. 21 is a flowchart of air-conditioning control according to exemplary embodiment 6.

FIG. 21 illustrates a flowchart of air-conditioning control.

First, in Step S101, a temperature distribution is obtained from the output of infrared sensor 43.

Next, in Step S102, the temperature of occupant 50 and the background temperature of seat 57 or the like are distinguished from each other on the temperature distribution detected by infrared sensor 43. The value of the average temperature of occupant 50 (hereinafter described as an occupant temperature) is calculated, and whether occupant 50 feels thermal (hereinafter described as a thermal sensation) is estimated from the occupant temperature and the background temperature. The thermal sensation has preset stages such as "hot", "very hot", "cold", "very cold", and "pleasant" according to how occupant 50 feels as the thermal sensation.

Next, in Step S103, an amount of solar radiation falling on occupant 50 is obtained on the basis of the illuminance level of dashboard 58 measured by solar radiation sensor 45. Next, in Step S104, whether or not there is sunlight is determined. Next, in Step S105, the result of estimation of the thermal sensation is corrected. A threshold value of the illuminance level is preset in solar radiation sensor I/F 48; when the illuminance level is greater than or equal to the threshold value, the result of estimation of the thermal sensation is corrected by moving up one stage on the "hot" side. In contrast, when the illuminance level is lower than the threshold value, the result of estimation of the thermal sensation is maintained at the obtained stage without correction.

When the correction of the thermal sensation is complete, a thermal sensation is determined on the basis of the next temperature distribution obtained by infrared sensor 43.

When the thermal sensation is estimated, HVAC 49 is controlled according to the result of estimation. For example, when the result of estimation of the thermal sensation is "hot", control such as decreasing the air conditioning temperature setting or raising the cooling fan speed is performed. Likewise, for example, when the result of estimation of the thermal sensation is "cold", control such as increasing the air conditioning temperature setting or raising the heating fan speed is performed.

HVAC 49 is controlled according to the result of estimation of the thermal sensation. Thus, air conditioning can be controlled according to the thermal sensation felt by occupant 50. It is possible to improve the degree of comfort for occupant 50.

Furthermore, since air-conditioning control device 41 according to exemplary embodiment 6 is capable of estimating the thermal sensation for each occupant 50, air conditioning may be controlled differently for each occupant 50. The thermal sensation varies depending on factors such as age, physical appearance, and sex of occupant 50, and moreover solar radiation may cause a change in the thermal sensation felt by each occupant. For example, when sunlight comes into vehicle 42 laterally, occupant 50 who is exposed to the sunlight feels hotter than occupant 50 who is not exposed to the sunlight. When it is estimated that each occupant 50 has a different thermal sensation, controlling air conditioning in a way that suits the thermal sensation felt by each occupant 50 makes it possible to further improve the degree of comfort for occupant 50. For example, in the case where sunlight comes in through window 66 on the driver seat side, the driver feels hot by the influence of the sunlight while the temperature feels adequate to occupant 50 on the passenger seat side. In other words, the thermal sensation felt by the driver is "hot" while the thermal sensation felt by occupant 50 on the passenger seat side is "pleasant". In such a case, the cooling system on the driver seat side is turned up. With this, the thermal sensation felt by the driver becomes "pleasant", and thus the driver can drive vehicle 42 comfortably.

In the case where the detected thermal sensation and how occupant 50 feels are different, the threshold value set in setting unit 60 may be changed. For example, when occupant 50 operates HVAC 49 by increasing the temperature setting or raising the fan speed while the detected thermal sensation is "pleasant", the threshold value set in setting unit 60 is changed so that the threshold value for "pleasant" is increased. In this way, the operation of occupant 50 on HVAC 49 is learned, and the result of learning is used to change the threshold value to be used in the estimation of the thermal sensation, making it possible to further improve the degree of comfort for occupant 50.

Note that although solar radiation sensor 45 is provided on dashboard 58, as illustrated in FIG. 18, in exemplary embodiment 6, solar radiation sensor 45 may be installed near window 66. When solar radiation sensor 45 is installed near window 66, the illuminance level of the sunlight falling on occupant 50 through window 66 can be accurately detected. This makes it possible to accurately estimate the thermal sensation felt by occupant 50, and thus the degree of comfort for occupant 50 can be improved.

Solar radiation sensor 45 may be provided on seat 57. When solar radiation sensor 45 is installed on seat 57, the illuminance level in a position closer to occupant 50 can be detected. For example, when solar radiation sensor 45 is provided on the headrest, the illuminance level of sunlight falling on the face of occupant 50 can be accurately detected. This makes it possible to accurately estimate the thermal sensation felt by occupant 50, and thus the degree of comfort for occupant 50 can be improved.

Note that although the present exemplary embodiment describes the configuration in which a vehicle (such as vehicle 8) includes a single air conditioner (such as air conditioner 6), the vehicle may include a plurality of air conditioners. In the case where the vehicle includes a plurality of air conditioners, a control unit (such as control unit 7) may control at least one of the plurality of air conditioners during a period in which a processing unit (such as processing unit 5) estimates a thermal sensation.

Note that the present disclosure is not limited to the exemplary embodiments described above. For example, other exemplary embodiments resulting from arbitrary combinations of structural elements described in the present specification or excluding some structural elements described in the present specification may also be exemplary embodiments of the present disclosure.

Furthermore, the present disclosure includes modifications obtainable through various changes to the above-described exemplary embodiments that can be conceived by a person having ordinary skill in the art without departing from the essence of the present disclosure, that is, the meaning of the language in the claims.

INDUSTRIAL APPLICABILITY

The present disclosure allows accurate air conditioning control dependent on the thermal sensation felt by an occupant, and as such is useful in vehicle air-conditioning control, etc.

REFERENCE MARKS IN THE DRAWINGS 1, 21 air-conditioning control device
2 occupant
3, 4 temperature sensor
5 processing unit
6 air conditioner
7 control unit
8 vehicle
9 driver
10 occupant
11 driver seat
12 passenger seat
13 computing unit
14 setting unit
15 clothing amount determining unit
16 correcting unit
17 louver
18 compressor
19 fan
22 portion determining unit
31 occupant temperature
32 occupant position
33 background temperature
40 air-conditioning operation signal
41 air-conditioning control device
42 vehicle
43 infrared sensor
44 scanning unit
45 solar radiation sensor
46 processing unit
47 infrared sensor I/F
48 solar radiation sensor I/F
49 HVAC
50 occupant
51 pixel unit
52 ceiling
53 detection region
54 long axis
55 post-scanning detection region
56 rotating shaft
57 seat
58 dashboard
59 computing unit
60 setting unit
61 correcting unit
62 control unit
63 louver
64 compressor
65 fan
66 window
101, 121, 131 air-conditioning control device
102 vehicle
103 temperature sensor
104 temperature sensor I/F
105 occupant
106 processing unit
107 air conditioner
108 control unit
109 ceiling
110 scanning unit
111 detection region
112 pixel unit
113 long axis
114 post-scanning detection region
115 rotating axis
116 computing unit
117 setting unit
118 louver
119 compressor
120 fan
132, 133, 134, 135 air outlet
136 dashboard

The invention claimed is:

1. An air-conditioning control device comprising:
a first temperature sensor which detects a temperature of an occupant;
a processor which estimates, from a result of detection by the first temperature sensor, a thermal sensation felt by the occupant; and
a control unit which controls an air conditioner according to the thermal sensation estimated by the processor, wherein
the processor determines a change in a clothing amount of the occupant from the result of detection by the first temperature sensor,
the control unit controls the air conditioner according to the change in the clothing amount determined by the processor,
a first threshold value is set in the processor, and
when an amount of a change in the result of detection by the first temperature sensor within a predetermined period of time is greater than the first threshold value, the clothing amount of the occupant is determined to have been changed.

2. The air-conditioning control device according to claim 1, wherein
at least one of a fan speed, an air temperature, and an air flow direction of the air conditioner is controlled according to the change in the clothing amount of the occupant.

3. The air-conditioning control device according to claim 1, further comprising
a second temperature sensor which detects a background temperature.

4. The air-conditioning control device according to claim 1, wherein
the processor detects a background temperature from an output of the first temperature sensor.

5. The air-conditioning control device according to claim 1, wherein
the processor determines an upper body and a lower body of the occupant from the result of detection by the first temperature sensor, and
the processor estimates, from the result of detection by the first temperature sensor, a thermal sensation felt in the upper body and a thermal sensation felt in the lower body.

6. The air-conditioning control device according to claim 5, wherein
the processor determines a head, an upper right body, and an upper left body of the occupant from a result of detection for the upper body included in the result of detection by the first temperature sensor, estimates a thermal sensation felt in the head, a thermal sensation felt in the upper right body, and a thermal sensation felt in the upper left body, and determines the change in the clothing amount according to a result of estimation of the thermal sensation felt in the upper right body and a result of estimation of the thermal sensation felt in the upper left body.

7. The air-conditioning control device according to claim 6, wherein
a second threshold value is set in the processor, and
when only one of a result of detection for the upper right body and a result of detection for the upper left body is greater than the second threshold value, the clothing amount of the occupant is determined to have not been changed.

8. The air-conditioning control device according to claim 1, wherein
the control unit controls the air conditioner so that an output of the air conditioner changes according to a result of estimation of the thermal sensation by processor.

9. The air-conditioning control device according to claim 8, wherein
the control unit controls the air conditioner so that an operation of the air conditioner is suspended during a period in which the processor estimates the thermal sensation.

10. The air-conditioning control device according to claim 8, wherein
the control unit controls the air conditioner so that the air conditioner has a reduced fan speed during a period in which the processor estimates the thermal sensation.

11. The air-conditioning control device according to claim 8, wherein
the control unit controls the air conditioner so that an air flow of the air conditioner is directed to where the occupant is absent during a period in which the processor estimates the thermal sensation.

12. The air-conditioning control device according to claim 8, wherein
the air conditioner is one of a plurality of air conditioners, and
the control unit controls at least one of the plurality of air conditioners during a period in which the processor estimates the thermal sensation.

13. The air-conditioning control device according to claim 8, further comprising
a motor which moves the first temperature sensor to scan an area where the occupant is present, wherein
the processor changes an output to the air conditioner in a period between when the infrared sensor completes scanning and when the infrared sensor starts next scanning.

14. The air-conditioning control device according to claim 13, wherein after the control unit controls the air conditioner according to the thermal sensation, the processor waits to estimate a subsequent thermal sensation until scanning of the first temperature sensor is completed at least twice.

15. The air-conditioning control device according to claim 1, further comprising:
a motor which moves the first temperature sensor to scan an area where the occupant is present; and
a solar radiation sensor which detects an interior illuminance level, wherein the processor estimates, from an output of the first temperature sensor, the thermal sensation felt by the occupant, and includes a correcting unit which corrects a result of estimation of the thermal sensation using an output of the solar radiation sensor, and
the control unit controls the air conditioner according to an output from the correcting unit.

16. The air-conditioning control device according to claim 1, wherein
the first temperature sensor is configured using an infrared sensor, and
the infrared sensor includes infrared sensing elements in a two-dimensional array including a plurality of pixel units.

17. The air-conditioning control device according to claim 16, further comprising
a motor which moves the infrared sensor to scan an area where the occupant is present, wherein
a distance the infrared sensor scans sensor is ¼ of a length of each of the pixel units along a long axis of the pixel unit.

18. The air-conditioning control device according to claim 16, further comprising
a motor which cans moves the infrared sensor to scan an area where the occupant is present, wherein
the infrared sensor scans along a long axis of each of the pixel units.

19. The air-conditioning control device according to claim 1, wherein
control of the air conditioner is changed for each occupant according to the thermal sensation felt by the occupant.

* * * * *